United States Patent [19]
Karls et al.

[11] Patent Number: 5,484,264
[45] Date of Patent: *Jan. 16, 1996

[54] TORSIONALLY TWISTING PROPELLER DRIVE SLEEVE AND ADAPTER

[75] Inventors: Michael A. Karls, Hilbert; Daniel R. Lindgren, Fond du Lac, both of Wis.

[73] Assignee: Brunswick Corporation, Lake Forest, Ill.

[*] Notice: The term of this patent shall not extend beyond the expiration date of Pat. No. 5,322,416.

[21] Appl. No.: 207,832

[22] Filed: Mar. 8, 1994

Related U.S. Application Data

[63] Continuation-in-part of Ser. No. 40,108, Mar. 30, 1993, Pat. No. 5,322,416, which is a continuation-in-part of Ser. No. 809,938, Dec. 18, 1991, Pat. No. 5,244,348.

[51] Int. Cl.⁶ .................................................. F01D 5/30
[52] U.S. Cl. .................................. 416/204 R; 416/93 A; 416/134 R; 464/89; 464/180
[58] Field of Search ....................... 416/204 R, 134 R, 416/169 R, 93 R, 93 A; 464/89, 180

[56] References Cited

U.S. PATENT DOCUMENTS

| | | |
|---|---|---|
| 2,125,270 | 8/1938 | Conover . |
| 2,164,485 | 7/1939 | Yantis . |
| 2,633,923 | 7/1953 | Hartz . |
| 2,948,252 | 8/1960 | Alexandria, Jr. ................ 416/93 A |
| 2,974,502 | 3/1961 | Radcliffe ............................ 464/89 |
| 3,230,739 | 1/1966 | Stewart . |
| 3,279,415 | 10/1966 | Kiekhaefer ..................... 416/93 A |
| 3,307,634 | 3/1967 | Bihlmire . |
| 3,321,024 | 5/1967 | Marconi, Jr. . |
| 3,477,794 | 11/1969 | Abbott et al. ..................... 464/89 |
| 3,567,334 | 3/1971 | Lorenz ........................... 416/134 R |
| 3,748,061 | 7/1973 | Heinrich ........................... 416/93 |
| 4,033,020 | 7/1977 | Hudgens ............................ 464/89 |
| 4,317,655 | 3/1982 | Schiek ............................... 440/78 |
| 4,338,064 | 7/1982 | Carmel ........................... 416/134 R |
| 4,452,591 | 6/1984 | Fishbaugh et al. ............... 464/89 |
| 4,566,855 | 1/1986 | Constabile et al. ............ 416/134 R |
| 4,642,057 | 2/1987 | Frazzell et al. ................... 440/52 |
| 4,667,530 | 5/1987 | Mettler et al. .................... 464/89 |
| 4,701,151 | 10/1987 | Uehara ........................... 416/134 R |
| 4,826,404 | 5/1989 | Zwicky ........................... 416/93 A |
| 4,842,483 | 6/1989 | Geary ............................. 416/93 A |
| 5,022,875 | 6/1991 | Karls .................................. 440/49 |
| 5,201,679 | 4/1993 | Velte, Jr. et al. .................. 440/49 |
| 5,244,348 | 9/1993 | Karls et al. .................... 416/204 R |
| 5,322,416 | 6/1995 | Karls et al. ........................ 416/204 |

FOREIGN PATENT DOCUMENTS

| | | |
|---|---|---|
| 664033 | 5/1963 | Canada ............................. 416/134 |
| 0360639 | 10/1989 | European Pat. Off. . |
| 528068 | 11/1921 | France ............................. 416/134 |
| 441009 | 8/1988 | U.S.S.R. ............................ 464/89 |
| 704497 | 2/1954 | United Kingdom .............. 416/134 |

*Primary Examiner*—John T. Kwon
*Attorney, Agent, or Firm*—Andrus, Sceales, Starke & Sawall

[57] ABSTRACT

A marine drive having a drive sleeve and a drive sleeve adapter between the propeller shaft and the propeller hub where the drive sleeve absorbs the shock of the propeller striking an object by torsionally twisting a forward end of the drive sleeve which is keyed to the propeller hub and where the adapter is keyed to the propeller shaft and the drive sleeve is keyed to the adapter. The combination provides both high load capability and shock protection.

24 Claims, 15 Drawing Sheets

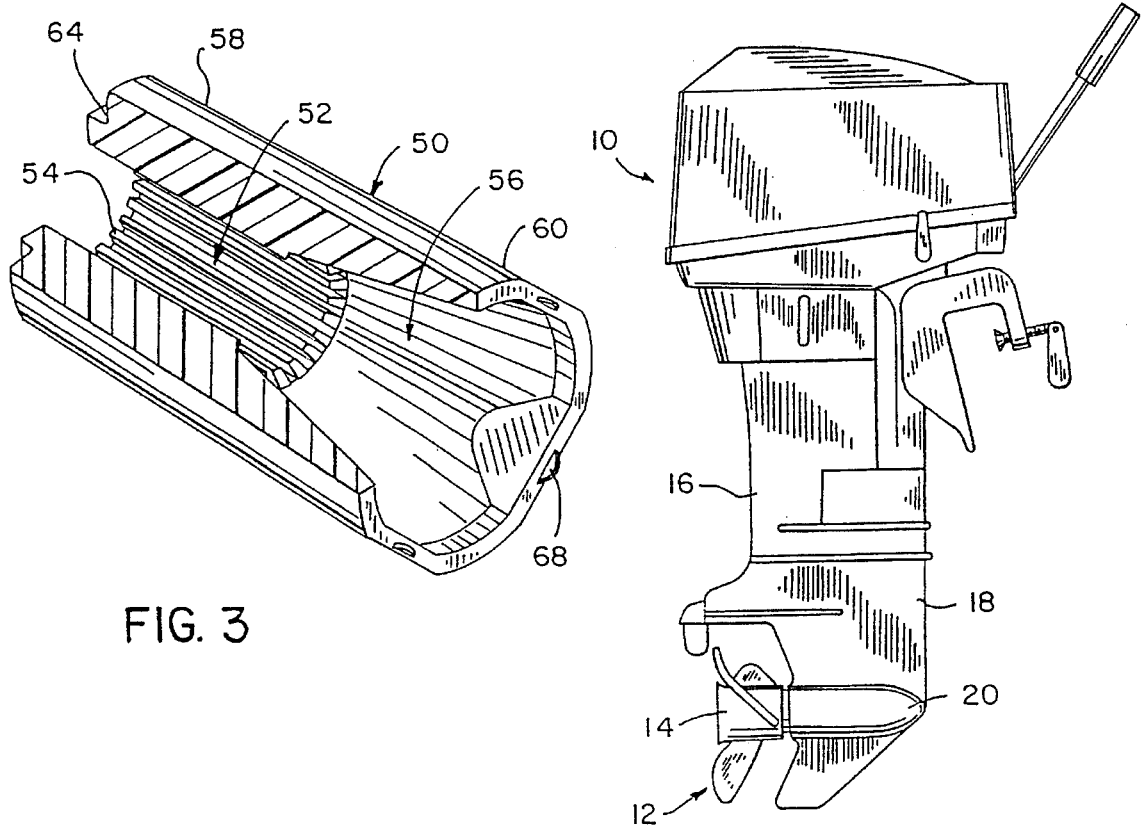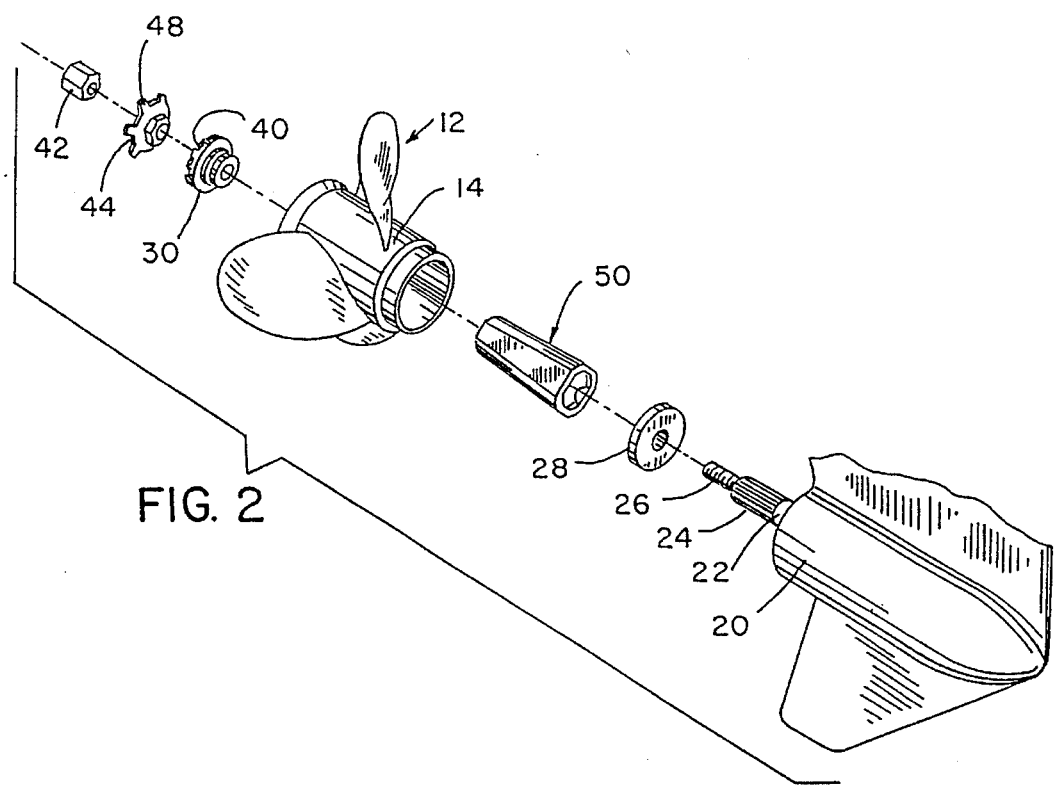

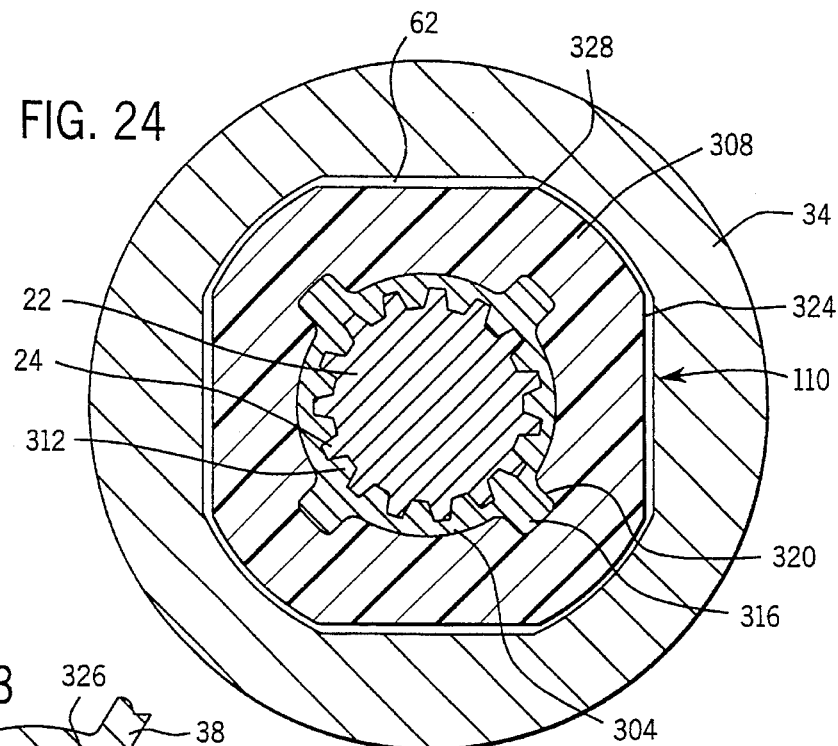
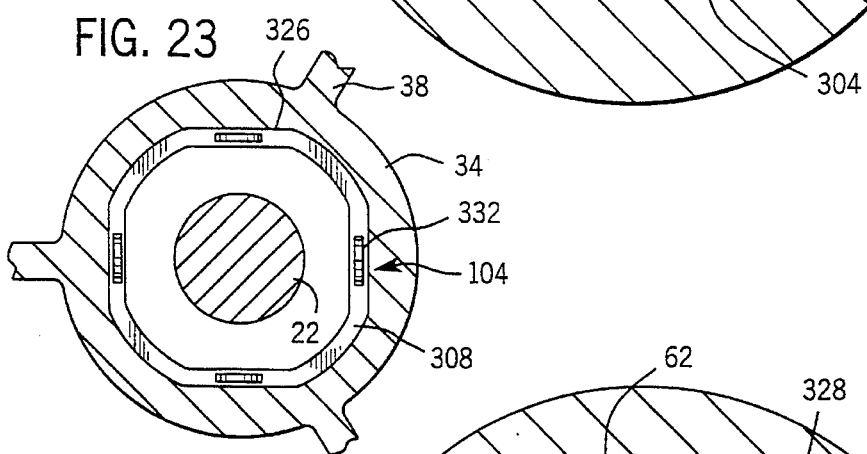
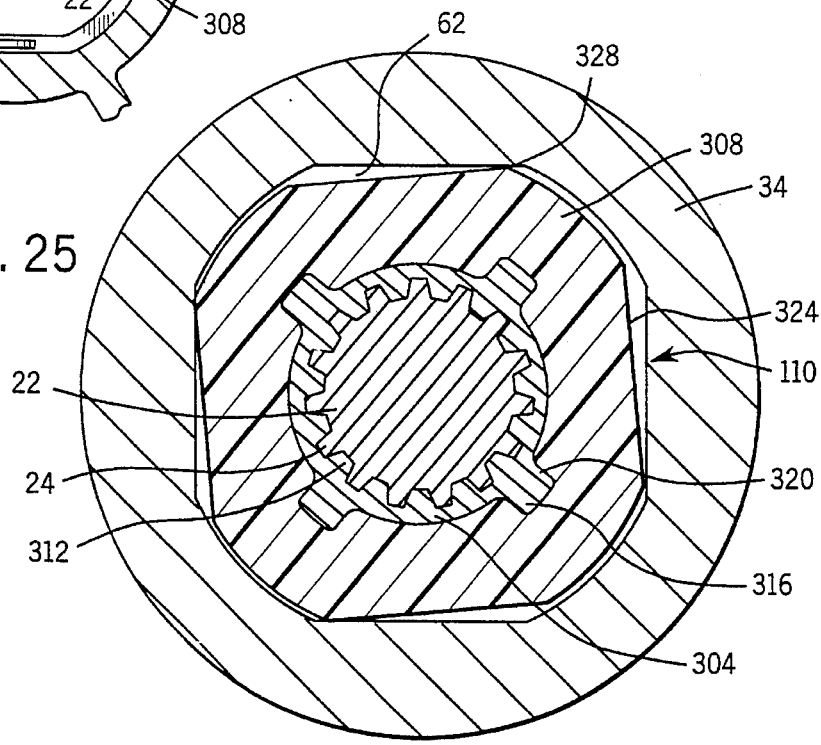

5,484,264

TORSIONALLY TWISTING PROPELLER DRIVE SLEEVE AND ADAPTER

CROSS REFERENCE TO RELATED APPLICATION

This application is a continuation-in-part of allowed U.S. application Ser. No. 08/040,108, filed Mar. 30, 1993, U.S. Pat. No. 5,322,416, which is a continuation-in-part of U.S. application Ser. No. 07/809,938, filed Dec. 18, 1991, U.S. Pat. No. 5,244,348, all incorporated herein by reference.

BACKGROUND AND SUMMARY

The invention relates to marine drives, and more particularly to a combination drive sleeve adapter and shock absorbing drive sleeve assembly mounting the propeller to the propeller shaft. The present invention evolved during continuing development and testing efforts directed toward providing a shock absorbing drive sleeve for protecting the propeller shaft and the marine drive when the propeller strikes an object. The present invention comprises a drive sleeve adapter and a shock absorbing drive sleeve assembly wherein the shock absorbing drive sleeve provides both shock absorption and high load capability. The shock absorption allows the propeller shaft to continue rotating through a limited angle after the propeller has been stopped by an object, and the high load capability supports enough torque to propel the boat through water, even under high load conditions. The drive sleeve adapter couples the shock absorbing drive sleeve to the propeller shaft.

The allowed parent applications disclose a onepiece shock absorbing drive sleeve composed of plastic, and although the plastic chosen provides sufficient product life, it was found during continued development and testing that a metal splined insert coupling the splined propeller shaft to the shock absorbing drive sleeve offered even greater service life by extending the metal-to-plastic lever arm outward. That is, the metal-to-plastic lever arm in the parent applications was at the splined propeller shaft/drive sleeve engagement area; whereas in the present embodiment, the metal-to-plastic lever arm is radially extended outward at the adapter/drive sleeve engagement area. Moving the lever arm radially outward reduces the force necessary, at that engagement area, to achieve the same torque as that at the radially inward engagement area. Therefore, extending the splines of the plastic shock absorbing drive sleeve radially outward results in increased drive sleeve spline life. The drive sleeve adapter may be a separate drive sleeve insert, or molded directly into the shock absorbing drive sleeve, or, as in the preferred embodiment, be a separate insert incorporating the rear thrust hub.

BRIEF DESCRIPTION OF THE DRAWINGS

FIG. 1 shows a marine drive.

FIG. 2 shows an exploded perspective view of a portion of FIG. 1, and illustrates propeller mounting structure in accordance with the noted parent application Ser. No. 07/809,938, U.S. Pat. No. 5,244,348.

FIG. 3 is a perspective view partially cut away of the drive sleeve of FIG. 2.

FIG. 23 is a sectional view taken along line 23—23 of FIG. 22.

FIG. 24 is a sectional view taken along line 24—24 of FIG. 22.

FIG. 25 is a view like FIG. 24 and shows a further rotated position.

DETAILED DESCRIPTION

Parent Inventions

Figure 4:
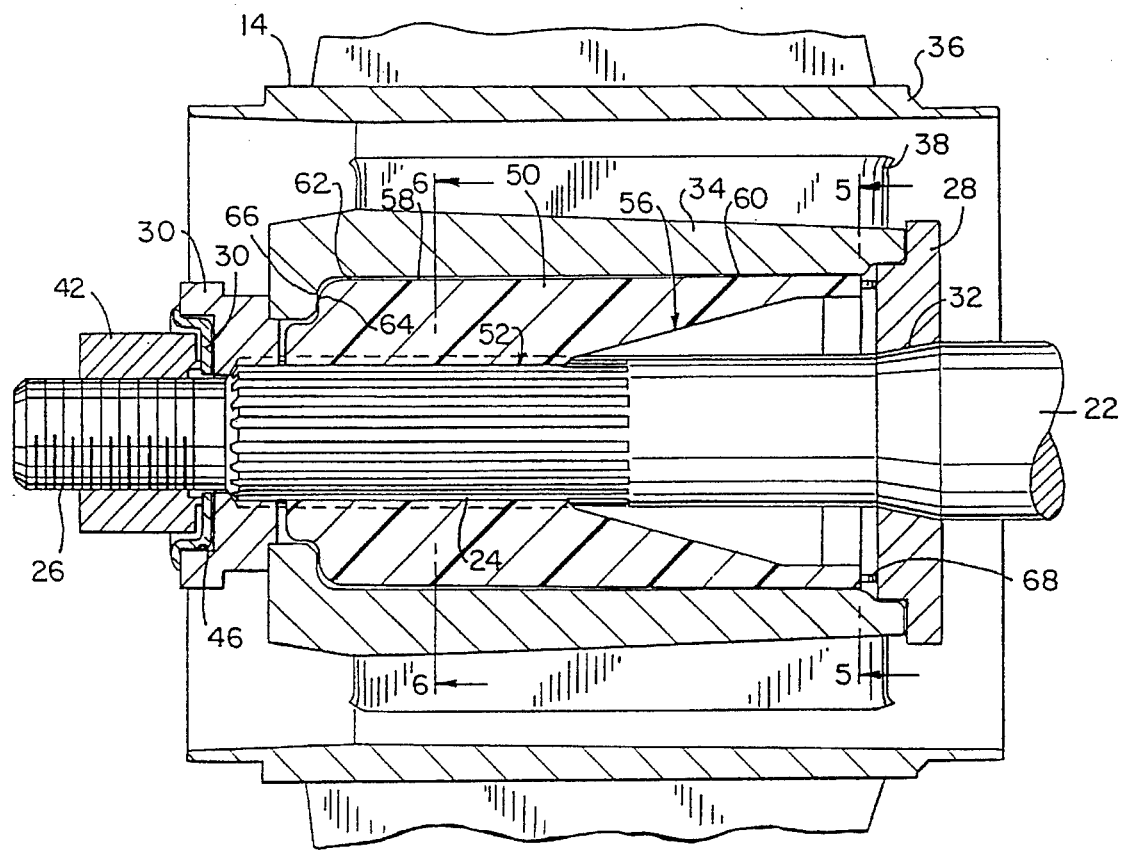
FIG. 4 is a cross sectional view of a portion of the structure of FIG. 2 in assembled condition.

FIG. 1 shows a marine drive 10 having a propeller with a propeller hub 14. The marine drive includes a driveshaft housing 16 with a lower gearcase 18 and torpedo housing 20. Propeller shaft 22, FIG. 2, extends rearwardly from torpedo housing 20 and has a splined portion 24 and a rear threaded portion 26. Propeller hub 14 is mounted to splined portion 24 between front and rear thrust hubs or washers 28 and 30, as in U.S. Pat. No. 5,022,875, incorporated herein by reference. Front thrust washer 28 bears against tapered transition portion 32, FIG. 4, of the propeller shaft. Hub 14 has an inner hub portion 34 connected to outer hub portion 36 by a plurality of radial spokes such as 38. The forward end of inner hub portion 34 bears against thrust washer 28. Rear thrust washer 30 is internally splined and received on portion 24 of the propeller shaft and engages the rear end of inner propeller hub portion 34 to mount the propeller hub to the propeller shaft. Rear thrust washer 30 has a plurality of outer slots 40, FIG. 2, spaced circumferentially around propeller shaft 22. A nut 42 is threaded onto rear threaded portion 26 of the propeller shaft. A locking tab washer 44 is around the propeller shaft between nut 42 and rear thrust washer 30. Locking tab washer 44 has an inner hex configured surface 46, FIG. 4, recessed forwardly and receiving hex nut 42 therein and preventing rotation of nut 42 relative to locking tab washer 44. Locking tab washer 44 has a plurality of tabs 48 extending radially outwardly therefrom and bendable forwardly into slots 40 to prevent rotation of locking tab washer 44 relative to rear thrust washer 30 which in turn is prevented from rotating relative to propeller shaft 22 by the noted splined mounting thereto at portion 24. For further reference relative to the mounting structure thus far described, reference is made to incorporated U.S. Pat. No. 5,022,875.

Propeller hub 14 is mounted to propeller shaft 22 at splined portion 24 by drive sleeve 50, FIGS. 2–4. Drive sleeve 50 has a rearward inner diameter portion 52 keyed to and engaging the propeller shaft in driven relation. It is preferred that inner diameter portion 52 have a plurality of molded-in splines or teeth 54 engaging the propeller shaft in splined driven relation at splined portion 24. Drive sleeve 50 has a forward inner diameter portion 56 axially spaced forwardly from inner diameter portion 52 and spaced radially outwardly of and disengaged from propeller shaft 22, FIG. 4. Forward inner diameter portion 56 is axially tapered, FIG. 4, to increasing radial separation from propeller shaft 22 with increasing axial distance from rearward inner diameter portion 52. Drive sleeve 50 has an annular thickness which is largest at rearward inner diameter portion 52, and which annular thickness decreases along forward inner diameter portion 56 with increasing axial distance from rearward inner diameter portion 52. The minimum annular thickness of the drive sleeve is at the forward axial end of forward inner diameter section 56 spaced axially farthest from rearward inner diameter section 52.

Drive sleeve 50 has a rearward outer diameter portion 58 radially aligned with rearward inner diameter portion 52. Drive sleeve 50 has a forward outer diameter portion 60 radially aligned with forward inner diameter portion 56 and axially spaced forwardly from inner diameter portion 52 and outer diameter portion 58.

The outer diameter of drive sleeve 50 is tapered to have a larger outer diameter at forward portion 60 than at rearward portion 58. Forward outer diameter portion 60 snugly engages the propeller hub at portion 34 in keyed relation, such as by providing a polygonal shape to each, FIG. 5. Rearward outer diameter portion 58 is spaced slightly radially inwardly of propeller hub portion 34 by a small gap 62 such that rearward outer diameter portion 58 of the drive sleeve may partially rotate relative to the propeller hub in response to rotation of the propeller shaft drivingly engaging inner diameter portion 52.

Figure 6:
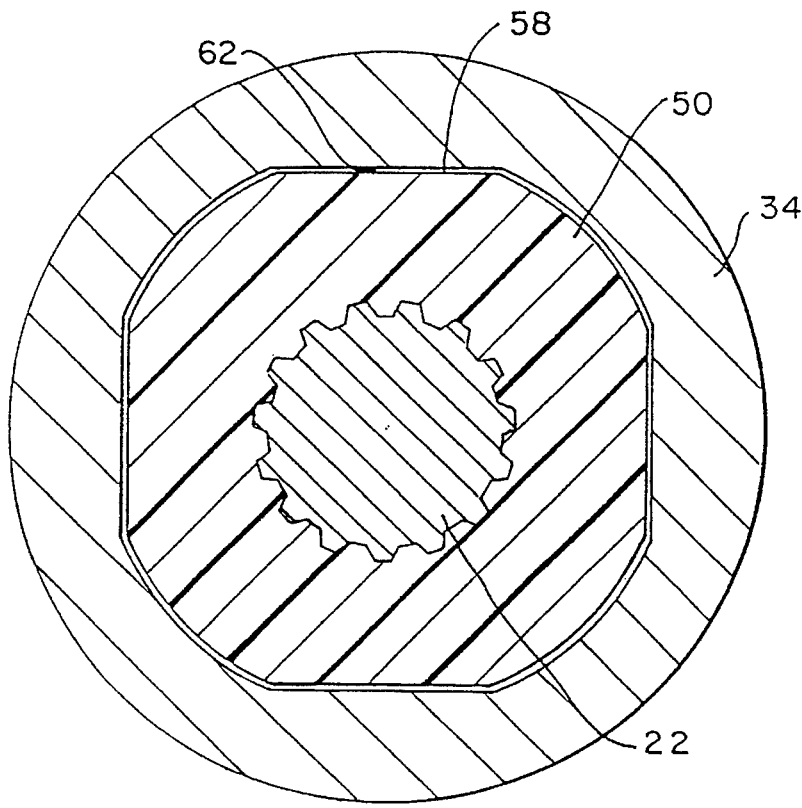
FIG. 6 is a sectional view taken along line 6—6 of FIG. 4.
Figure 7:
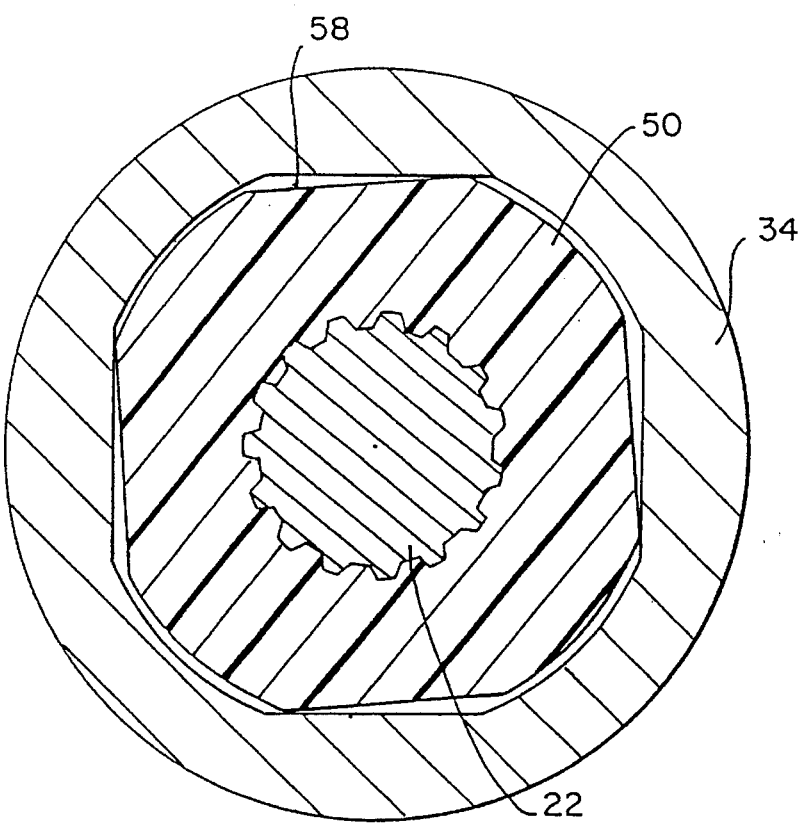
FIG. 7 is a view like FIG. 6 and shows a further rotated position.

When the propeller strikes an object, the shock is absorbed by torsional twisting of drive sleeve 50 wherein rearward inner diameter portion 52 and rearward outer diameter portion 58 continue to rotate to a further rotated position, FIG. 7, than the position of forward outer diameter portion 60, whereafter splines 54 of the drive sleeve shear. FIG. 6 shows the normal position of rearward outer diameter portion 58 of drive sleeve 50 relative to propeller hub portion 34. When the propeller strikes an object, portion 58 continues to rotate to the further rotated position shown in FIG. 7. The torsional twisting of the drive sleeve followed by shearing of splines of teeth 54 protects the propeller shaft and the drive. The magnitude of the shear force is set by the axial extent of splines 54 of the drive sleeve. The torsional twisting deformation of the drive sleeve absorbs shock when the propeller strikes an object.

During assembly, drive sleeve 50 is slid rearwardly into the propeller until its rearward shoulder 64 is stopped against shoulder 66 of propeller hub portion 34. The hub is then slid forwardly onto the propeller shaft until the forward end of hub portion 34 engages forward thrust washer 28. Rearward thrust washer 30, locking tab washer 44 and nut 42 are then assembled and torqued down. Forward molded spacing bumps 68 on drive sleeve 50 are compressed during torquing down of nut 42 and provide tolerance compensation.

The outer surface of drive sleeve 50 and the inner surface of propeller hub 34 are tapered relative to each other such that the radial gap 62 therebetween increases as one moves axially rearwardly. At the forward end of the drive sleeve, there is a snug fit with no gap, FIG. 5. At the rearward end of the drive sleeve, radial gap 62 has increased to its largest dimension, FIG. 8. When the propeller strikes an object, and the propeller shaft 22 and the rearward portion of drive sleeve 50 continue to rotate to further rotated positions, outer tips such as 102, FIG. 7, on the drive sleeve engage the inner surface of inner propeller hub 34. The axial length of such engagement increases with increasing angular rotation of propeller shaft 22 and the rearward portion of drive sleeve 50. For example, referring to FIG. 4, assume that the propeller has struck an object and that propeller shaft 22 and the rearward portion of drive sleeve 50 continue to rotate even though inner propeller hub 34 has stopped. After 1° of rotation, not only does drive sleeve 50 engage propeller hub 34 at forward area 104, but also at area 106 slightly rearwardly thereof, due to the noted rotation. Without such rotation, there is a small gap at area 106 between drive sleeve 50 and propeller hub 34. Continuing with this example, after 2° of rotation, the drive sleeve outer tips 102 have now been rotated into contact with propeller hub 34 at area 108. After 3° of rotation, the point of such interference contact now extends rearwardly to area 110, such that the axial length of interference engagement now extends from forward area 104 rearwardly to area 110. After 5° of rotation, there is contact at area 112, which is illustrated in FIG. 7. The noted example is illustrative, and the points of contact may vary depending upon tolerances and taper.

It is believed particularly important to minimize shock load to the drive within the first 5° of rotation of the propeller shaft after the propeller is stopped by an object. Hence, it is preferred that the tapered gap 62 between drive sleeve 50 and propeller hub 34 be such as to allow at least 5° of rotation before drive sleeve 50 engages inner propeller hub 34 in interference fit relation for at least some axial distance of such fit, such as from area 104 to area 112, FIG. 4.

Figure 8:
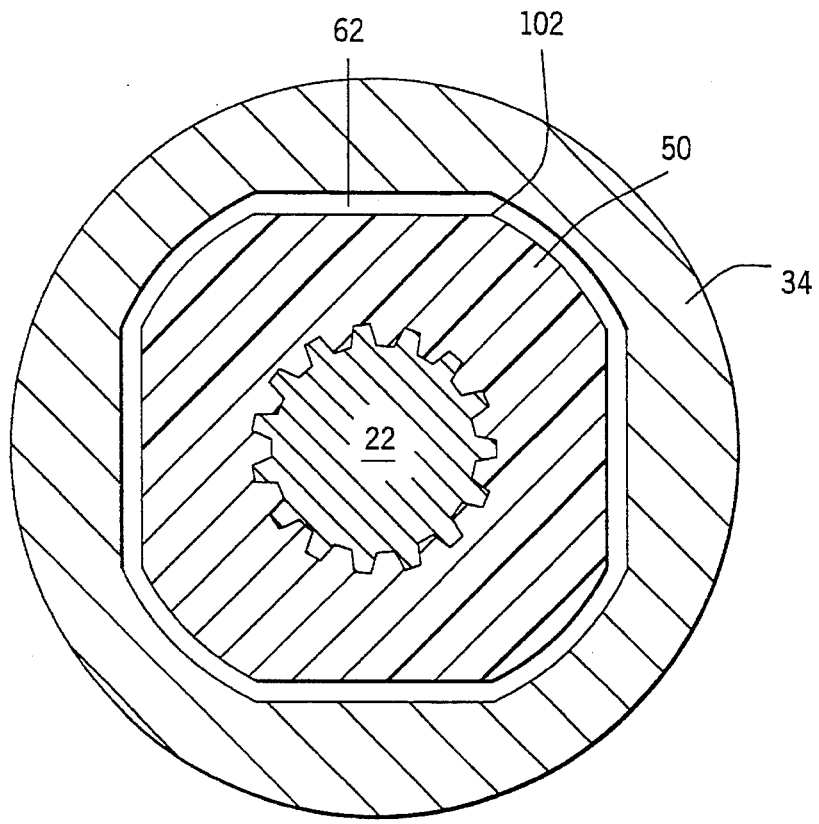
FIG. 8 is a sectional view taken along line 8—8 of FIG. 4 and also shows a further modification in accordance with noted allowed parent application Ser. No. 08/040,108.
Figure 9:
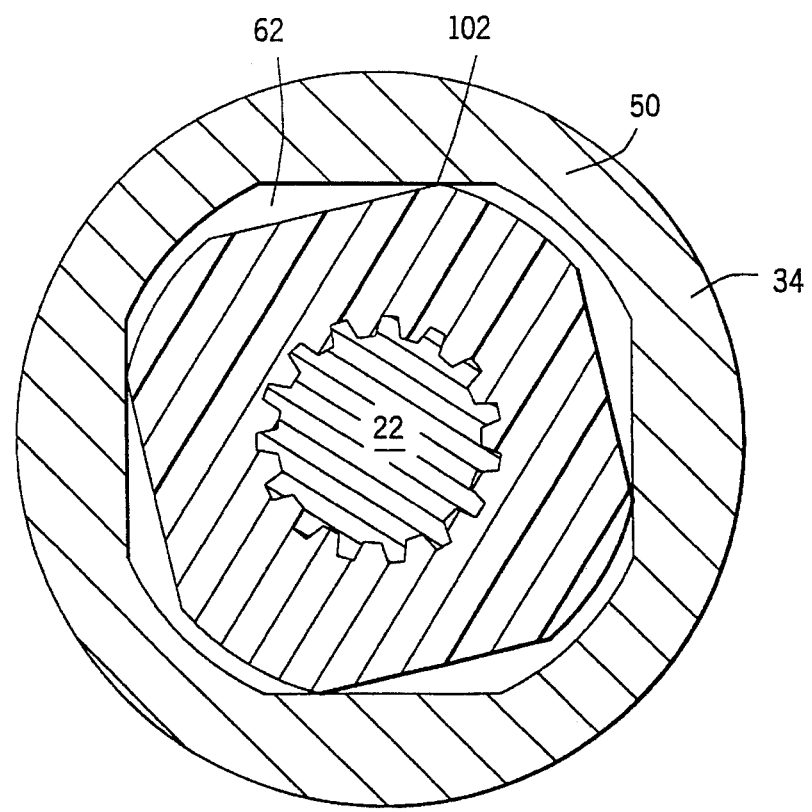
FIG. 9 is a view like FIG. 8 and shows a further rotated position.

Further rearward areas such as 114, FIG. 4, rotate to even further rotated positions than area 112. For example, FIG. 8 shows that gap 62 is wider at area 114 than at area 112, FIG. 6. Accordingly, the rearward portion of drive sleeve 50 at area 114 rotates to a further rotated position, FIG. 9. As each area 106, 108, 110, etc., FIG. 4, of the drive sleeve progressively engages propeller hub 34 in interference fit, the remaining rearward portion of drive sleeve 50 continues to rotate by torsionally twisting. The engaged area may continue to rotate slightly due to compression of tip 102, and torsional twisting relative to areas forward thereof.

The noted torsional twisting is a function of the structural configuration and the material of drive sleeve 50. As noted above, it is desirable that the drive sleeve material be sufficiently soft, i.e. have a low spring rate, particularly at low angles of rotation, i.e. less than 5°, to permit continued rotation of the drive sleeve and propeller shaft for at least 5° after the propeller stops. As noted above, it is believed particularly important to minimize shock load during this initial range of rotation, to dampen initial impact. On the other hand, it is desirable that the drive sleeve material be sufficiently strong, i.e. high spring rate, to support enough torque for high load conditions, preferably at least 1,000 lb.ft. of torque.

Figure 10:
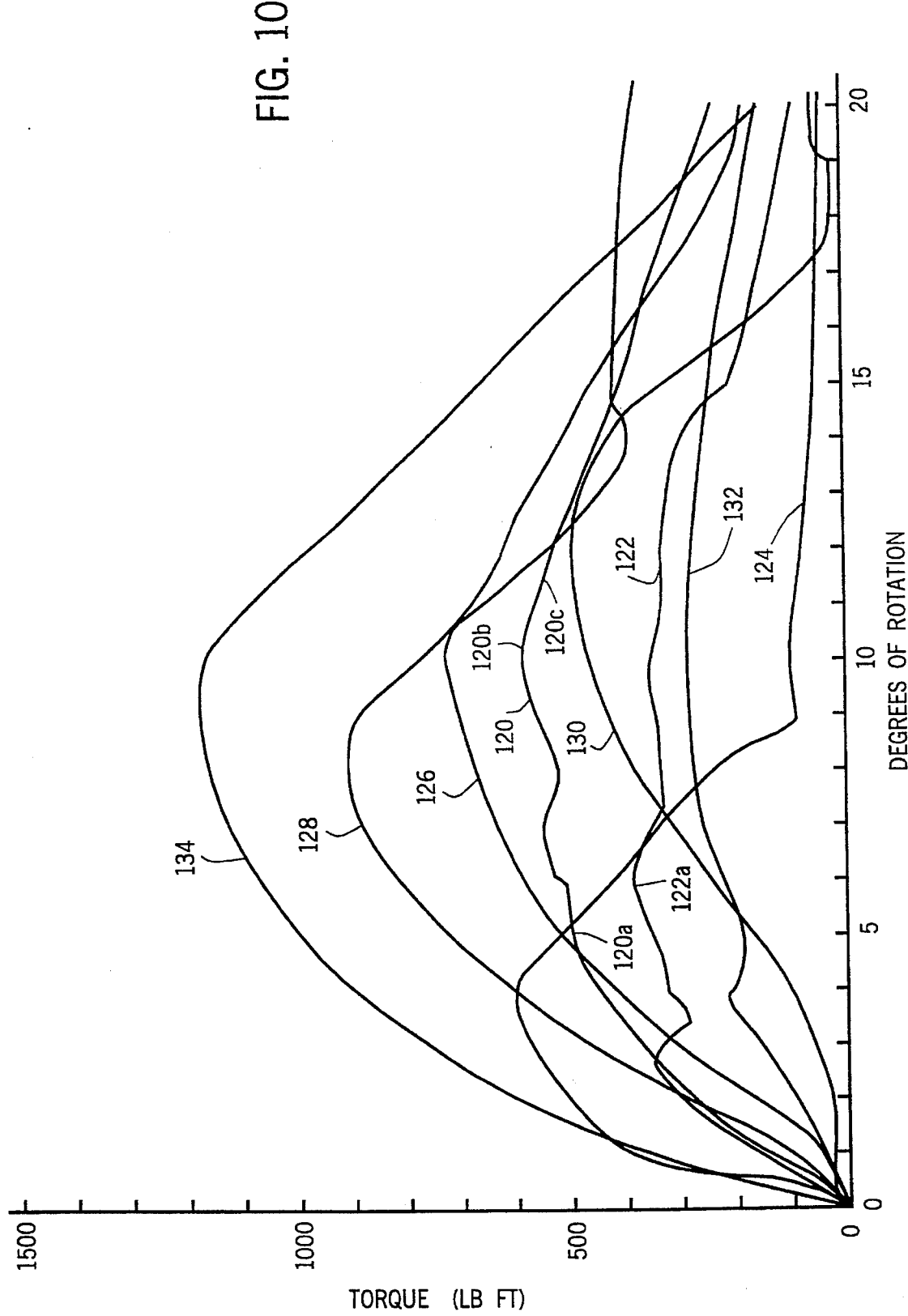
FIGS. 10–14 are graphs showing rotation versus torque.
Figure 11:
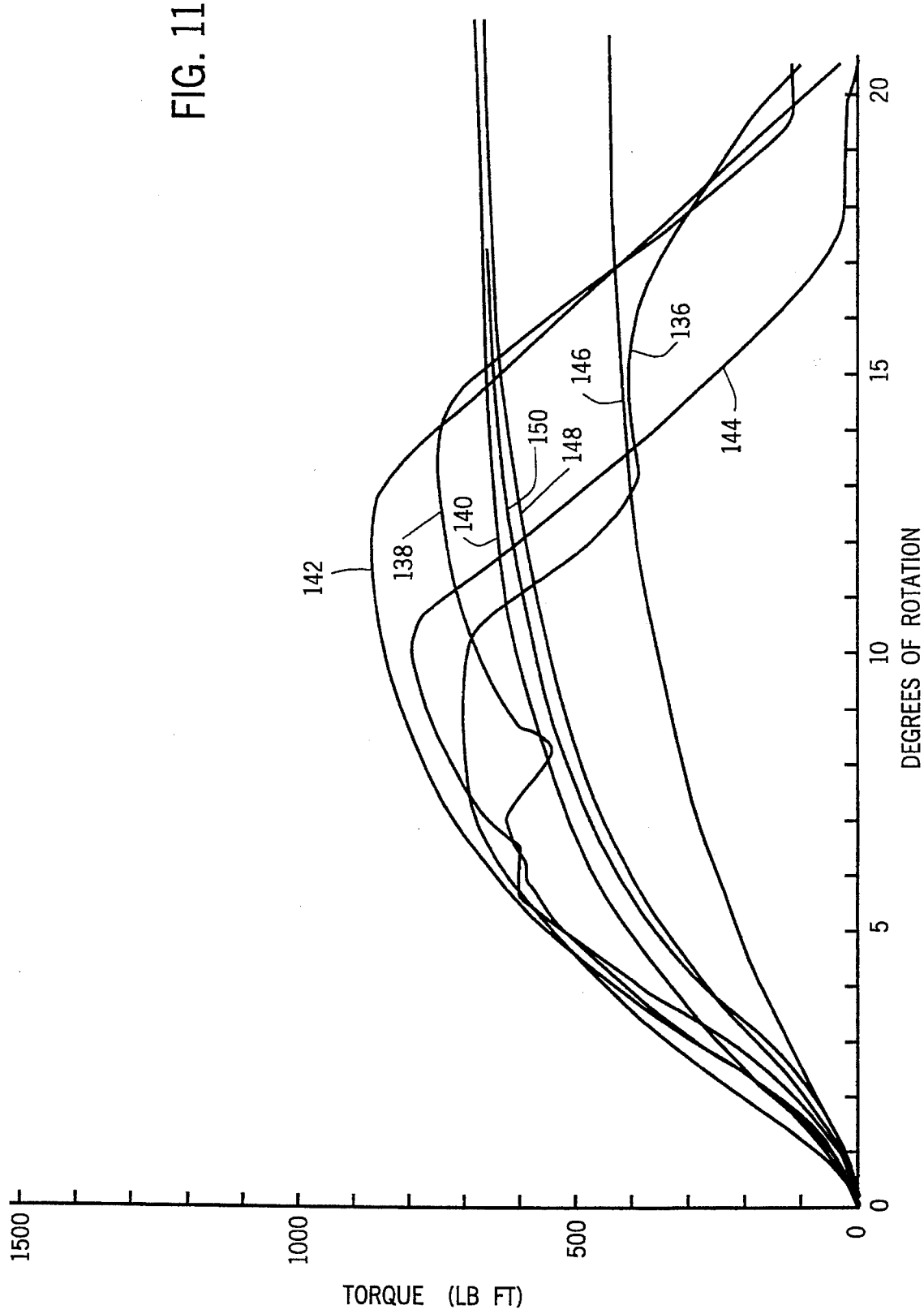
Figure 12:
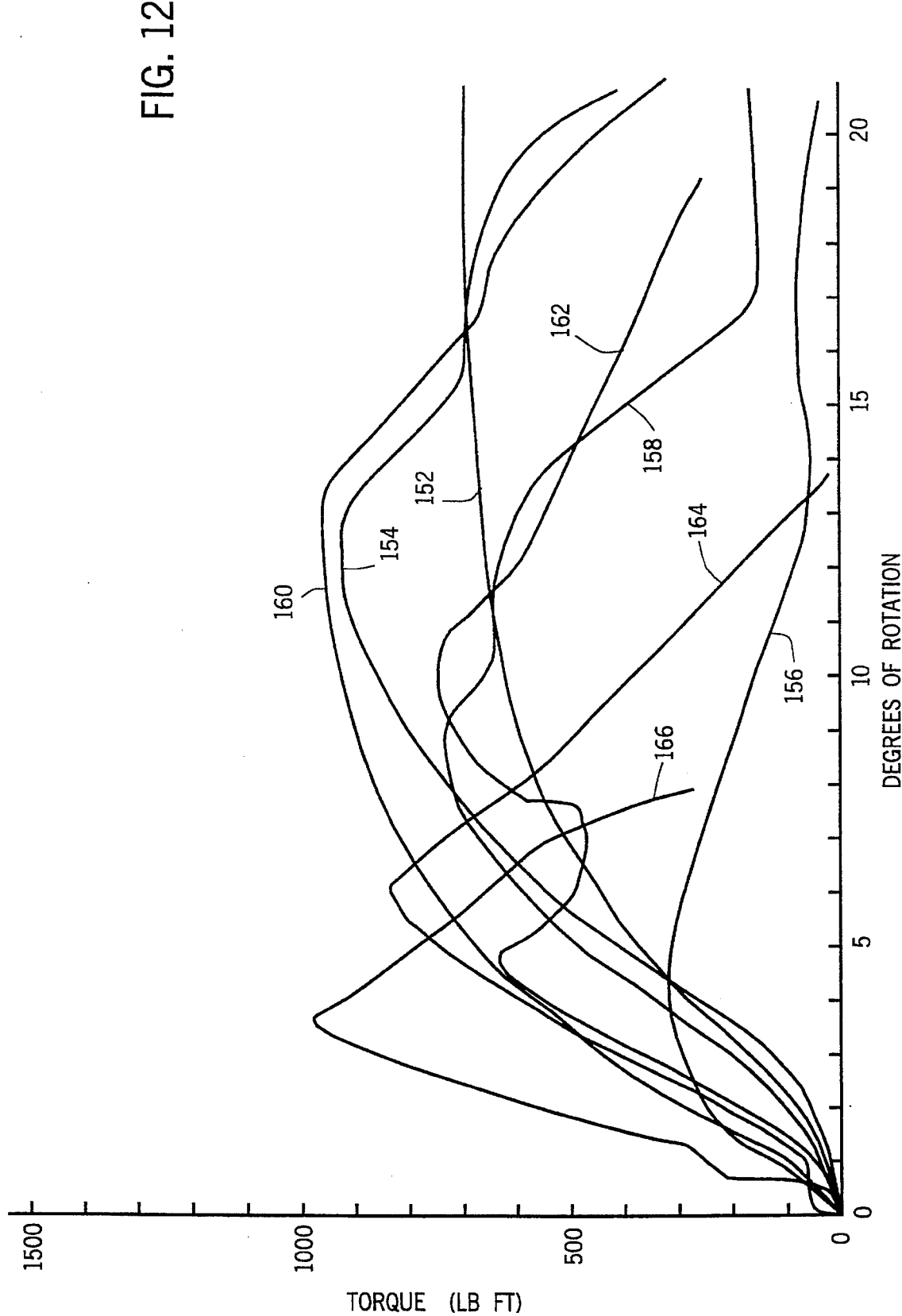

Numerous drive sleeve materials were tried, and the test results are plotted in FIGS. 10–12 showing torque in lb.ft. versus degrees of rotation of propeller shaft 22 after the propeller has been stopped. In general, the plots show increasing torque with increasing rotation as drive sleeve 50 torsionally twists, followed by decreasing torque with increasing rotation corresponding to failure of the drive sleeve, i.e. shearing of splines 54 and sometimes cracking and splintering of the drive sleeve. The various drive sleeve materials represented by the plots in FIGS. 10–12 are unacceptable because: a) the torque increased too quickly at low angles of rotation, e.g. the torque rose above 500 lb.ft. at less than 5° of rotation; and/or b) the drive sleeve would not support 1,000 lb.ft. torque before failure. If the torque increases too quickly at low angles of rotation, the drive material is too stiff, i.e. the spring rate is too high. This is unacceptable because, as above noted, it is believed that most damage occurs within 5° of rotation after the propeller stops, and hence a low spring rate is desired, at least for the first 5° of rotation. The noted second ground for unacceptability of the drive sleeve material is its torque bearing capability. In order to propel the boat under high load conditions, it is desired that the drive sleeve be able to support at least 1,000 lb.ft. torque before failure.

Trace 120, FIG. 10, shows the test results for a drive sleeve composed of an acetal plastic material known in the trade as Delrin 500. This material is unacceptable because at 5° of rotation of propeller shaft 22 after the propeller has stopped, the torque has already risen to 500 lb.ft., as indicated at 120a, and hence such material is too stiff, and is deemed not soft enough to absorb shock and prevent damage as desired, i.e. the spring rate is too high. Furthermore, the highest torque bearing capability is only about 600 lb.ft., as indicated at 120b, whereafter the torque decreases as shown at 120c indicating failure of the drive sleeve.

Trace 122 shows the test results for a drive sleeve composed of acetal plastic material known in the trade as Delrin 100, which material is unacceptable because its maximum torque bearing capability is only about 400 lb.ft., as shown at 122a.

Trace 124 is for a drive sleeve composed of polypropylene including 15% glass and 20% mica by weight, which material is unacceptable because of its high initial spring rate providing rapidly increasing torque to over 500 lb.ft. at less than 5° of rotation, and because it only supports a maximum torque of about 600 lb.ft. before failure.

Trace 126 is for a drive sleeve of polyester PBT material with no glass, and is unacceptable because of the high spring rate at angles less than 5° causing the torque to increase too quickly, and because it supports only about 700 lb.ft. torque before failure.

Trace 128 is for Nypel Type 6 nylon material with 15% glass, and is unacceptable because of the high initial spring rate causing the torque to increase above 500 lb.ft. at angles less than 5°, and because it supports a maximum torque of only about 900 lb.ft. before failure.

Trace 130 is for thermoplastic polyurethane TPU with 30% glass, and is unacceptable because it supports a maximum torque of only about 500 lb.ft. before failure.

Trace 132 is for polypropylene with no glass, and is unacceptable because it supports a maximum torque of only about 300 lb.ft. before failure.

Trace 134 is for acetal polyplenco bar stock material known in the trade as Delrin 150E, and is unacceptable because of its high initial spring rate causing the torque to rise too quickly to about 1,000 lb.ft. at 5° rotation, and hence does not provide the damage protection desired. The material of trace 134 does have a desirable torque bearing capability of nearly 1,200 lb.ft. before failure.

Trace 136, FIG. 11, is for polyester PBT with 10% glass, known in the trade as Celanex 5200 and 2002, and is unacceptable because of its initially high spring rate causing the torque to increase to about 500 lb.ft. at 5° rotation, and because it supports a maximum torque of only about 700 lb.ft. before failure.

Trace 138 is for acetal plastic material with 10% glass known in the trade as Celcon GC25A and M25, and is unacceptable because of its initially high spring rate causing the torque to increase too quickly to about 500 lb.ft. at 5° of rotation.

Trace 140 is for nylon copolymer NC with no glass, and is unacceptable because it supports a maximum torque of only about 700 lb.ft.

Trace 142 is for nylon blend 30% glass and copolymer and 15% the noted type 6, and is unacceptable because of its initially high spring rate causing the torque to increase too quickly to about 500 lb.ft. at 5° rotation.

Trace 144 is for acetal plastic 25% glass filled material, and is unacceptable because of its initially high spring rate causing the torque to increase too quickly to about 500 lb.ft. at 5° rotation.

Trace 146 is for acetal plastic Delrin ST material, and is unacceptable because it supports maximum torque of only about 400 lb.ft.

Trace 148 is for acetal plastic blend material including 50% Delrin 100 and 50% Delrin ST, and is unacceptable because it supports maximum torque of only about 700 lb.ft.

Trace 150 is for acetal blend material including Delrin II 150E and 25% Delrin 100 ST, and is unacceptable because it supports maximum torque of only about 700 lb.ft.

Trace 152, FIG. 12 is for acetal blend material including Delrin II 150E and 10% Delrin 100 ST, and is unacceptable because it supports maximum torque of only about 700 lb.ft.

Trace 154 is for acetal plastic material known in the trade as Celcon UV90, and is unacceptable because the torque is already about 500 lb.ft. at about 5% of rotation.

Trace 156 is for polypropylene material with 30% glass, and is unacceptable because it supports maximum torque of only about 300 lb.ft.

Trace 158 is for polyester PBT material known in the trade as Celanex 2002, and is unacceptable because the initial spring rate is too high since the torque is already about 500 lb.ft. at 5° of rotation, and because it supports maximum torque of only about 700 lb.ft. before failure.

Trace 160 is for Delrin 150E material with 1% Activex 535 foaming agent, and is unacceptable because of its initially high spring rate causing the torque to increase above 500 lb.ft. at less than 5% of rotation.

Trace 162 is for acetal plastic material known in the trade as Delrin II 900, and is unacceptable because the torque is already about 500 lb.ft. at 5° of rotation, and because it supports maximum torque of only about 700 lb.ft. before failure.

Trace 164 is for a nylon 6–12 Zytel GRZ 77633 material, and is unacceptable because the initial spring rate is too high, causing the torque to increase above 500 lb.ft. at less than 5° of rotation.

Trace 166 is for PET Rynite 545 material, and is unacceptable because the initial spring rate is too high, causing the torque to rapidly increase above 500 lb.ft. at less than 5° of rotation.

Figure 13:
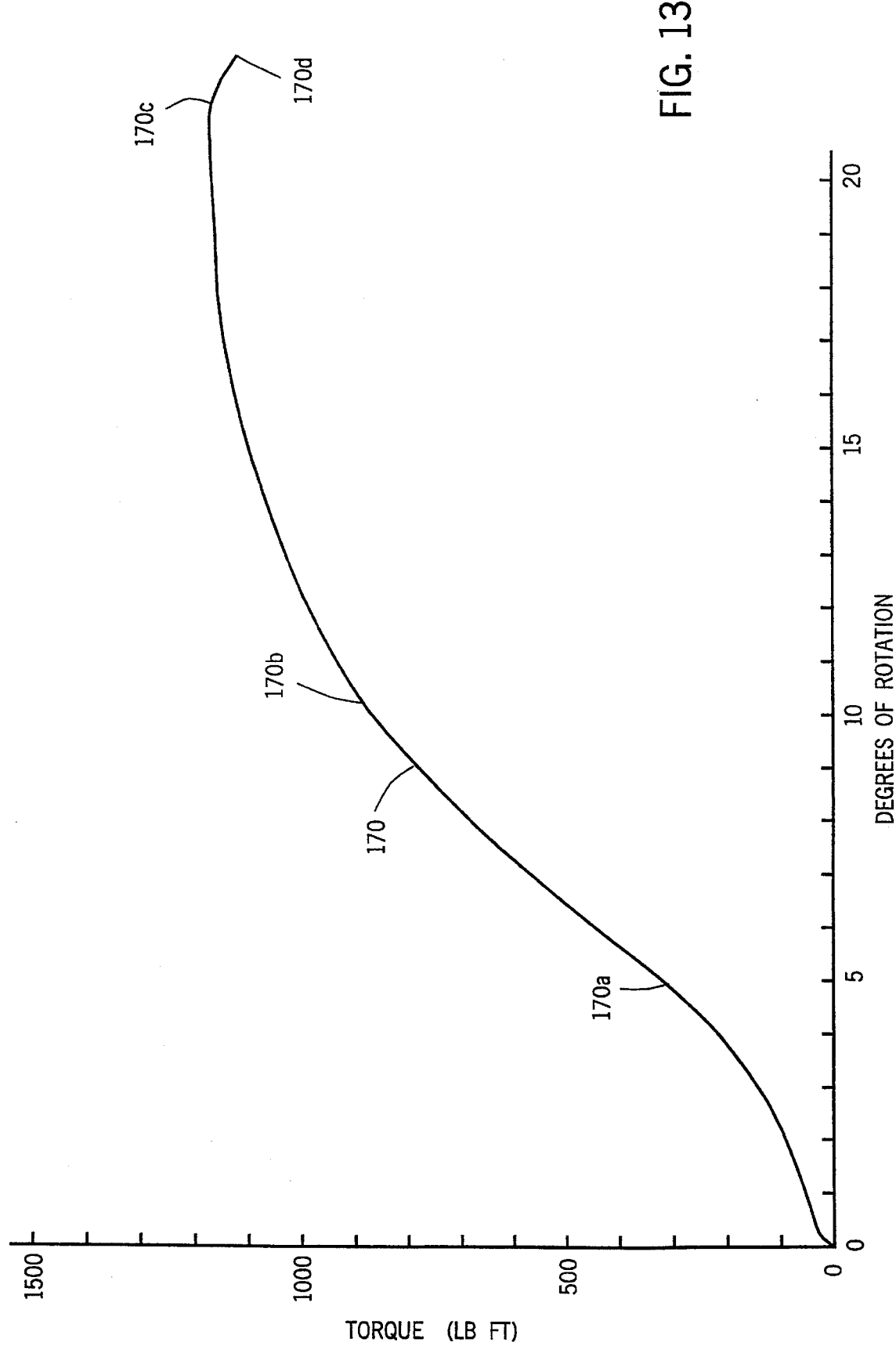

Trace 170, FIG. 13, shows the test results for a drive sleeve composed of extrudable grade acetal resin plastic material known in the trade as Delrin II 150E. As shown by the trace, this material is found to provide at least 5° of torsional twisting angular rotation at torque loads less than 500 lb.ft., and has a spring rate less than 100 lb.ft. per degree for torsional twisting from 0° to 5°. Furthermore, the drive sleeve torsionally twists to angular rotations greater than 5° and supports over 1,000 lb.ft. torque before failure. From 5° to 10°, the spring rate from point 170a to point 170b is greater than 100 lb.ft. per degree. The sleeve supports about 1,200 lb.ft. torque at point 170c at about 20° rotation, before failure as indicated at 170d.

As shown in FIG. 13, the noted material has an initially low spring rate causing the torque to rise only to about 300 lb.ft. at point 170a at 5° of rotation. This spring rate is less than 100 lb.ft. per degree of rotation, and is low enough to provide a soft enough material, at least during initial rotation, to absorb shock, in accordance with the above noted belief that it is particularly important to minimize shock load within the first 5° of propeller shaft rotation after the propeller has been stopped.

From 5° to 10° rotation, FIG. 13, the torque increases from about 300 lb.ft. at point 170a to about 900 lb.ft. at point 170b, which is a spring rate greater than 100 lb.ft. per degree. This is desirable because it causes the torque to rise more rapidly after the initial 5° of rotation, which increase is desirable so that the ultimate torque supported by the sleeve can increase above 1,000 lb.ft. The torque supported by the drive sleeve increases to about 1,000 lb.ft. at about 12°–13° of rotation, and ultimately reaches about 1,200 lb.ft. at about 20° of rotation before failure.

The noted drive sleeve structural configuration and material in combination provide torsional twisting angular rotation at a first spring rate less than 100 lb.ft. per degree from 0° to 5° rotation, a second higher spring rate from 5° to 10° rotation, and supports over 1,000 lb.ft. torque before failure. In accordance with the parent and present invention, it is desirable that the initial spring rate be as low as possible up to about 5° of rotation, and then increase rapidly to support over 1,000 lb.ft. torque. If most of the shock can be absorbed within the first 5° of rotation, it is desirable to then rapidly increase the torque load bearing capability of the drive sleeve. It is desirable that the drive sleeve continue to rotate to at least about 15° or 20° of rotation before failure, though this is not deemed critical since most of the shock should already have been absorbed prior thereto, i.e. from 0° to 5° rotation.

Figure 14:
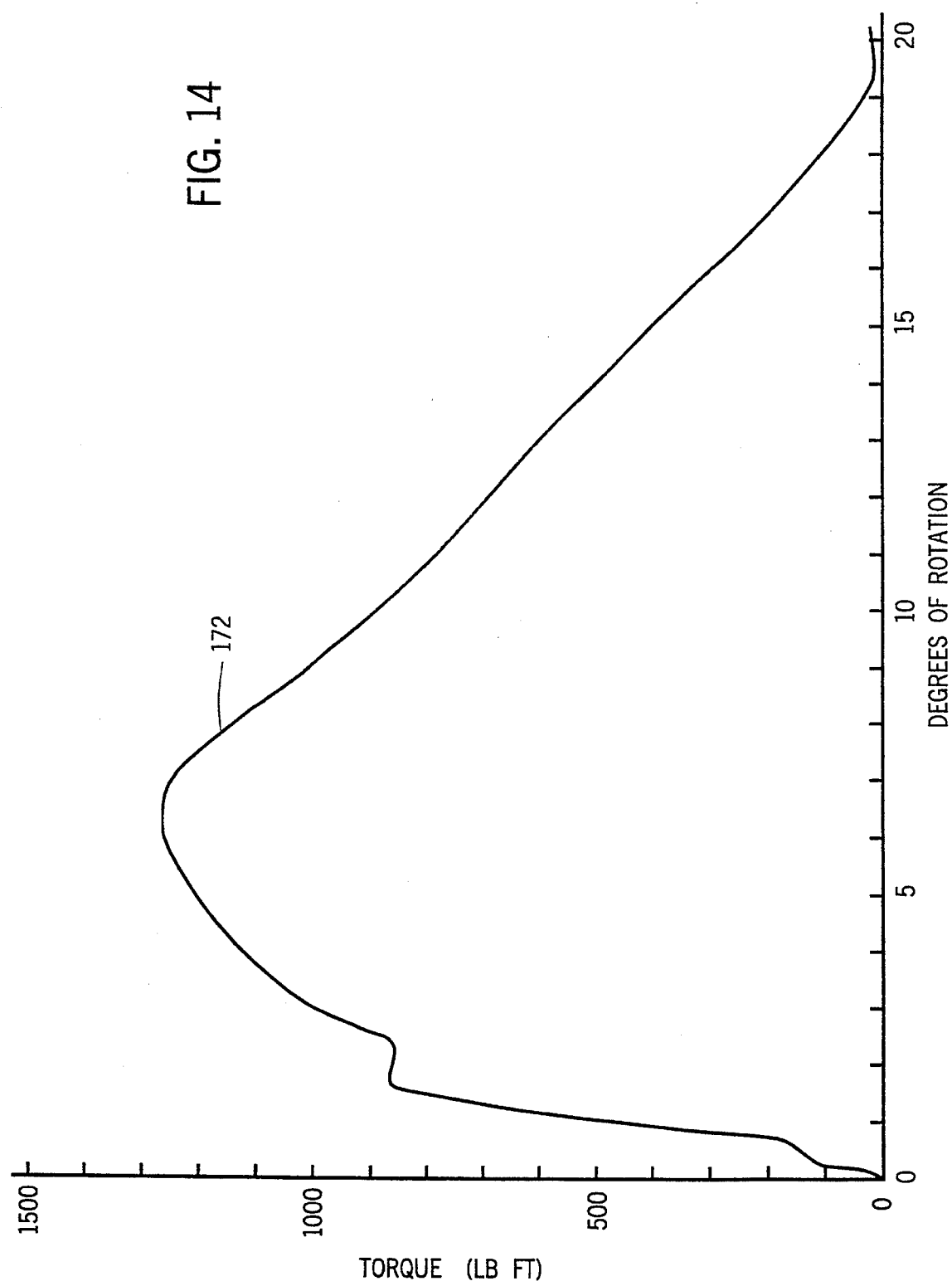

As an experiment, the drive sleeve of the noted material performing as shown in FIG. 13 was modified by filling gap 62 between drive sleeve 50 and propeller hub 34 with epoxy, and letting same harden. This was done in order to prevent torsional twisting. The test results on the latter drive sleeve are shown at trace 172 in FIG. 14, wherein the torque rapidly rises well above 1,000 lb.ft. at less than 5° rotation. A comparison of FIGS. 13 and 14 illustrates the difference between the torsional twisting of the invention and a rigid non-twisting drive sleeve or a drive sleeve with a high initial spring rate.

Figure 5:
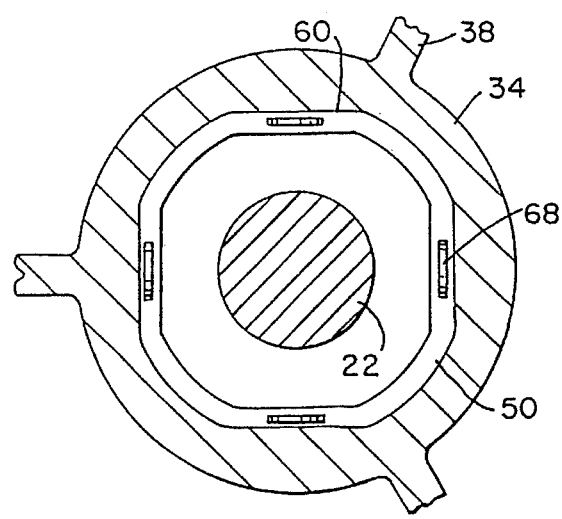
FIG. 5 is a sectional view taken along line 5—5 of FIG. 4.
Figure 15:
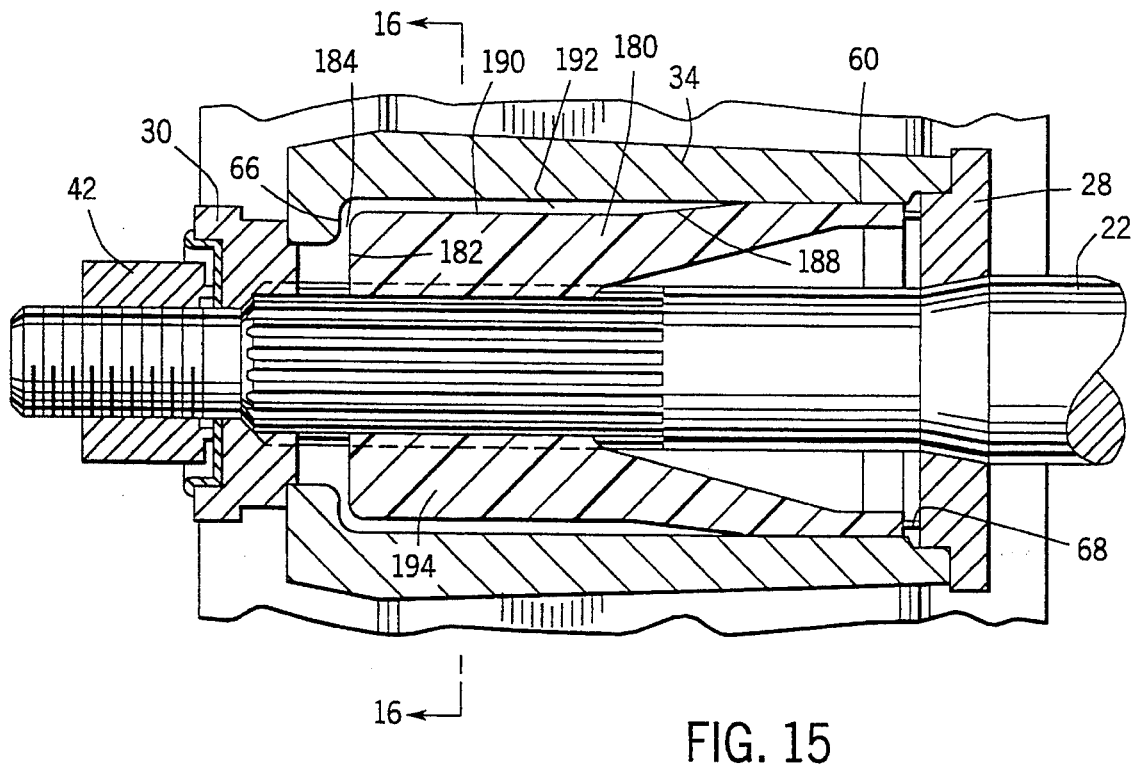
FIG. 15 is similar to FIG. 4 and shows a further embodiment.

FIG. 15 shows an alternate embodiment, and uses like reference numerals from FIG. 4 where appropriate to facilitate understanding. Drive sleeve 180 has a flat rearward end 182 spaced slightly forwardly of shoulder 66 of propeller hub 34 by an axial gap 184. The tapered fit of the drive sleeve within the propeller hub at forward portion 60 limits rearward movement of the drive sleeve and forces bumps 68 against forward thrust washer 28 as noted above, forward molded spacing bumps 68 on the drive sleeve are compressed during torquing down of nut 42 and provide tolerance compensation. As shown in FIG. 5, bumps 68 are spaced about the propeller shaft in a balanced pattern providing balanced axial loading and uniform axial registration of the drive sleeve within propeller hub 34 and on propeller shaft 22 to prevent cocking of the drive sleeve relative thereto and maintaining alignment of the drive sleeve parallel to propeller hub 34 and parallel to propeller shaft 22. The drive sleeve may include rearward reduced diameter extended portion 186 as in FIG. 4, or the latter portion may be omitted as shown in FIG. 15, for example to change the axial length of drive sleeve splines 54 to alter the ratio thereof to the overall axial length of the drive sleeve. In the preferred embodiment, the drive sleeve inner diameter portion engaging propeller shaft 22 has an axial length which is about 40% to 50% of the overall axial length of the drive sleeve.

Figure 16:
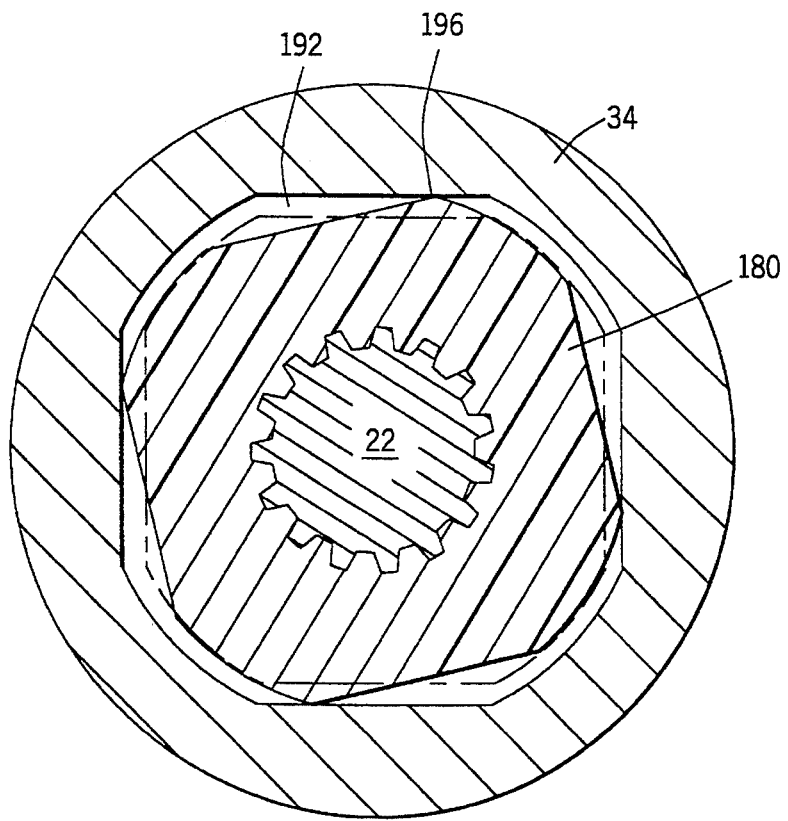
FIG. 16 is a sectional view taken along line 16—16 of FIG. 15.

Another modification in the embodiment of FIG. 15 is the step reduction at 188 of the outer diameter of the drive sleeve between forward outer diameter portion 60 and rearward outer diameter portion 190. Step reduction 188 reduces the outer diameter of the drive sleeve along a sharper taper than the taper of the inner diameter of propeller hub 34 to provide a gap 192 between propeller hub 34 and rearward outer diameter portion 190. In this manner, when the propeller stops, the drive sleeve continues to rotate and there is no progressive interferences fit engagement of the propeller hub by the outer tips 102 of the rearward portion of the drive sleeve as in FIG. 4. Instead, the drive sleeve in FIG. 15 torsionally twists along its axial extent rearward of step 188 until a rearward portion such as 194 engages propeller hub 34 as shown at outer tip engagement point 196, FIG. 16. In this manner, the continued rotation of propeller shaft 22 and torsional twisting of drive sleeve 180 does not have to additionally compress the outer tips or corners such as 102, FIGS. 7 and 9, of the drive sleeve, which tips engage propeller hub 34 and progressively compress at progressive areas 106, 108, 110, etc., to permit continued rotation of propeller shaft 22 and torsional twisting of the drive sleeve. The embodiment of FIG. 4 is preferred because it is believed that such additional corner compression at tips 102 aids in increasing the spring rate between points 170a and 170b, FIG. 13. It is believed that the embodiment in FIG. 15 will also provide increased spring rate during rotation, but not until higher degrees of rotation. The latter may be desirable if it is desired to absorb shock and provide further minimization of shock load beyond the initial 5° of rotation. It is believed that the embodiment of FIG. 15 will provide progressive spring rates as in FIG. 4, but will enable a lower spring rate to be maintained beyond the initial 5° of rotation, followed by a higher spring rate.

Figure 17:
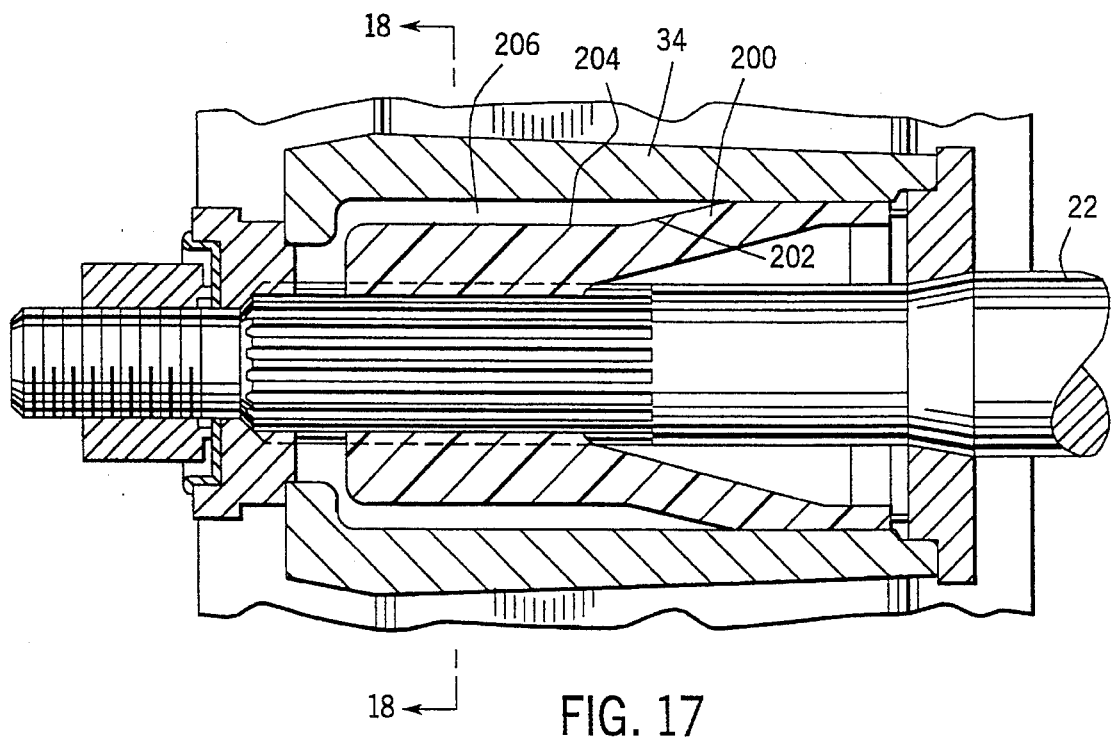
FIG. 17 is similar to FIG. 15 and shows a further embodiment.
Figure 18:
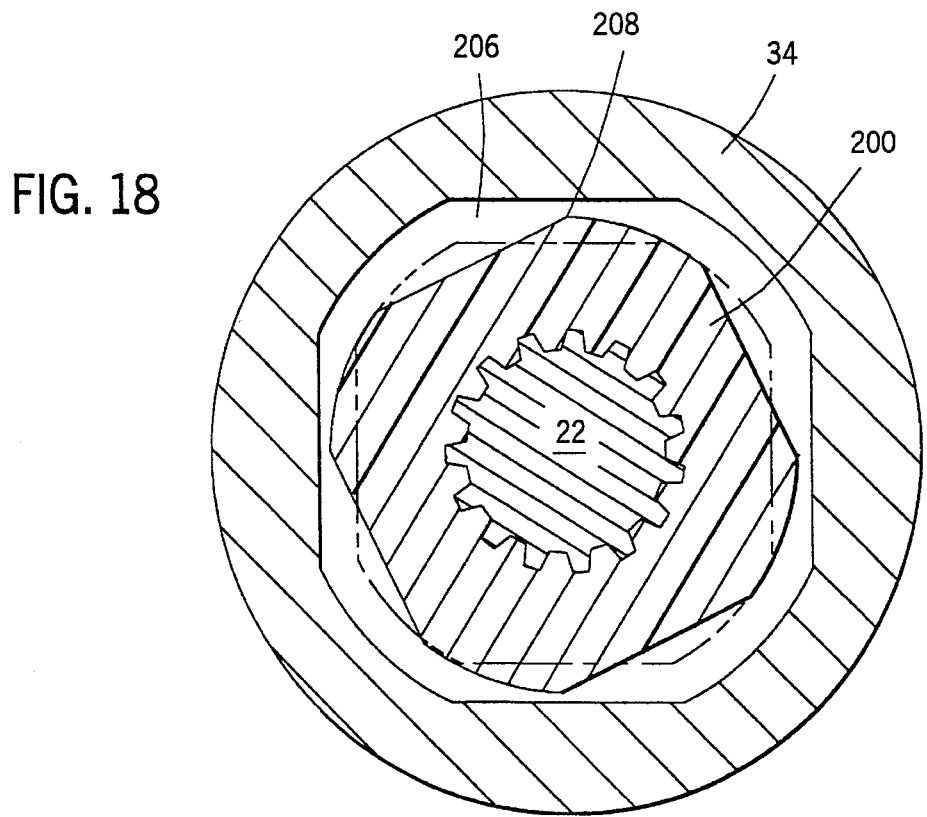
FIG. 18 is a sectional view taken along line 18—18 of FIG. 17.

FIG. 17 shows a further embodiment and uses like reference numerals from FIGS. 4 and 15 where appropriate to facilitate understanding. Drive sleeve 200 has a step 202 to a reduced outer diameter 204 spaced from propeller hub 34 by a radial gap 206 which is wide enough such that outer tips 208, FIG. 18, of outer diameter portion 204 of the drive sleeve do not engage propeller hub 34 in interference fit relation, but instead are free to rotate therein. In this embodiment, the increasing spring rate after an initial range of rotation relies entirely upon the drive sleeve material itself, without relying upon compression of outer tips such as 102, FIGS. 7 and 9, or 218, FIG. 16, to additionally increase the spring rate. In the embodiment of FIGS. 4 and 15, respective radial gaps 62 and 192 normally extend continuously around the entire periphery of the rearward outer diameter portion of the drive sleeve, unless the propeller strikes an object, where upon selected sections of the gap are closed, FIGS. 7, 9 and 16, at respective points 102 and 196, as the rearward outer diameter portion of the drive sleeve rotates through a given angle relative to the propeller hub and engages the propeller hub in interference fit at selected sections such as 102 and 196. The rearward outer diameter portion of the drive sleeve includes a plurality of radiused corners spaced radially inwardly of the propeller hub and rotatable through the given angle relative to the propeller hub to engage the propeller hub at the noted selected sections. In the embodiment of FIG. 17, the outer tips such as 208 of the drive sleeve at the edges of the radiused corners do not engage the propeller hub even upon continued rotation of the propeller shaft and drive sleeve after the propeller has been stopped.

Present Invention

Figure 19:
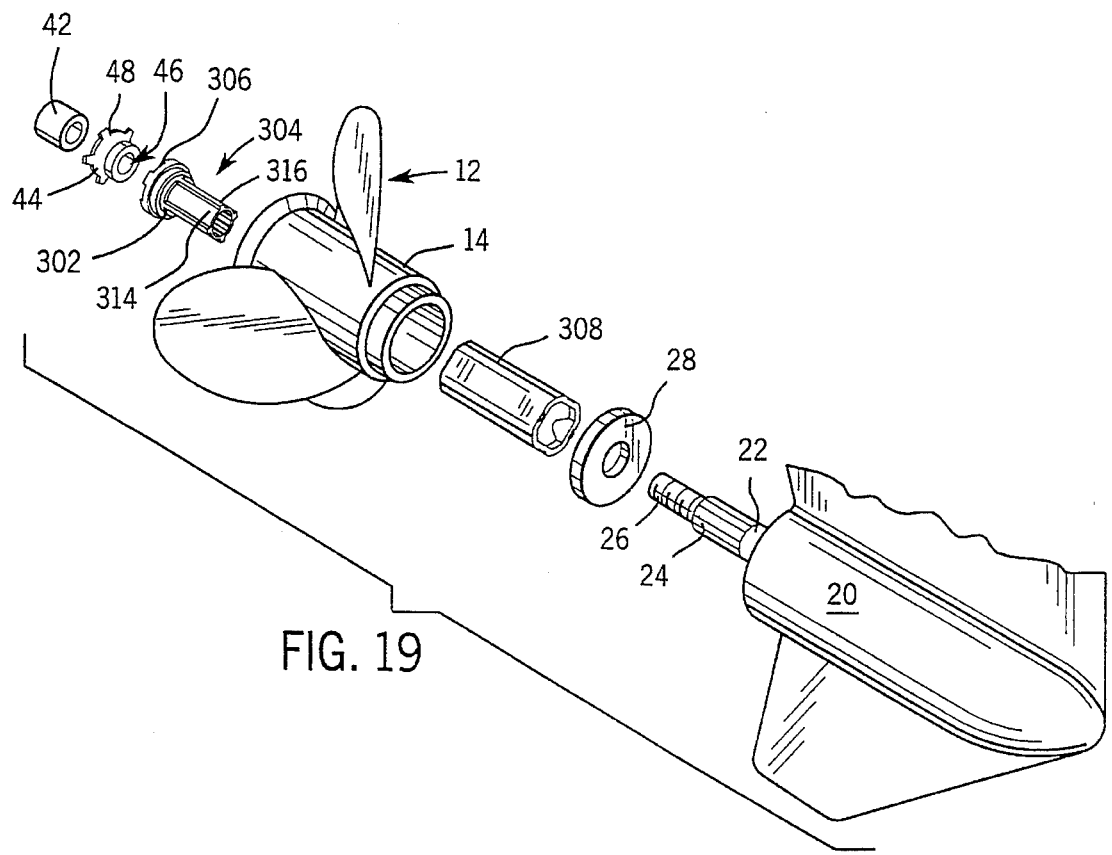
FIG. 19 shows an exploded perspective view of a portion of FIG. 1, and illustrates propeller mounting structure in accordance with the present invention.
Figure 20:
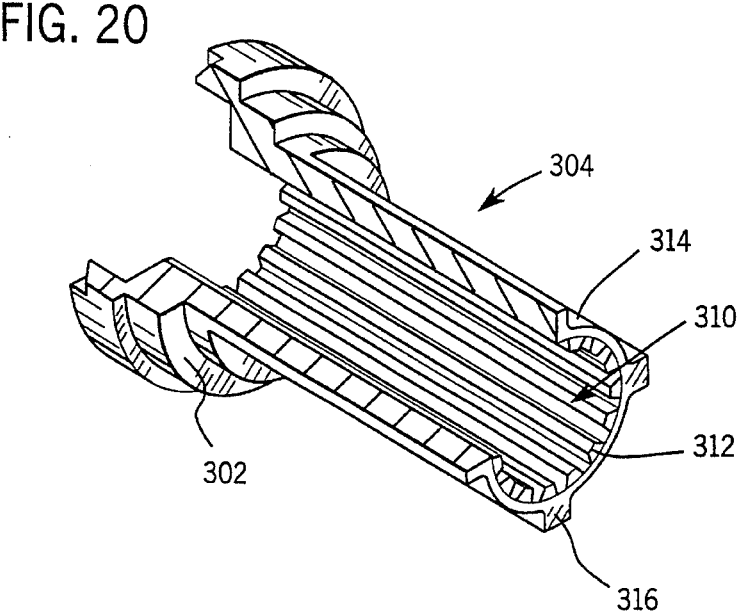
FIG. 20 is a perspective view partially cut away of the drive sleeve adapter of FIG. 19.

FIGS. 19–27 use the same reference numerals from FIGS. 1–18 where appropriate to facilitate understanding. FIG. 19 illustrates the propeller mounting structure in accordance with the present invention. Propeller shaft 22 extends rearwardly from torpedo housing 20 and has a splined portion 24 and a rear threaded portion 26. Propeller hub 14 is mounted to splined portion 24 between front thrust washer or hub 28 and rear thrust washer or hub 302 of drive sleeve adapter 304, FIGS. 19 and 20. Front thrust washer 28, FIG. 19, bears against tapered transition portion 32, FIG. 22, of propeller shaft 22. Hub 14 has an inner hub portion 34 connected to outer hub portion 36 by a plurality of radial spokes such as 38, FIG. 23. Hub 14, FIG. 19, receives drive sleeve 308, FIGS. 19 and 21, within inner hub portion 34, FIG. 22. The forward end of inner hub portion 34 bears against thrust washer 28.

Drive sleeve adapter 304 is internally splined and received on splined portion 24 of propeller shaft 22 and engages the rear end of inner propeller hub portion 34 for mounting propeller hub 14 and drive sleeve 308 to propeller shaft 22. Drive sleeve adapter 304 has rear thrust hub 302 forwardly facing on the rear end of drive sleeve adapter 304. Rear thrust hub 302 of adapter 304 has a plurality of outer slots 306, FIG. 19, rearwardly facing and spaced circumferentially around propeller shaft 22. Locking tab washer 44 is placed over propeller shaft 22 and against drive sleeve adapter 304. Nut 42 is threaded onto rear threaded portion 26 of propeller shaft 22. Locking tab washer 44 has an inner hex configured surface 46, FIGS. 19 and 22, recessed forwardly and receiving hex nut 42 to prevent rotation of nut 42 relative to locking tab washer 44. Locking tab washer 44 also has a plurality of tabs 48 extending radially outward and bendable forward into slots 306 of adapter 304 to prevent rotation of locking tab washer 44 relative to rear thrust hub 302 of adapter 304 which in turn is prevented from rotating relative to propeller shaft 22 by the noted splined mounting thereto at portion 24.

Propeller hub 14 is mounted to propeller shaft 22 at splined portion 24 by drive sleeve adapter 304 and drive sleeve 308. Drive sleeve adapter 304, FIG. 20, has an inner diameter portion 310 keyed to and engaging the propeller shaft in driven relation. It is preferred that inner diameter portion 310 have a plurality of splines 312 engaging the propeller shaft in splined driven relation at splined portion 24, FIG. 22. Drive sleeve 308 and adapter 304 have an overall axial length, and inner diameter portion 310 engaging propeller shaft 22 has an axial length which is 40% to 50% of said overall axial length. Drive sleeve adapter 304 has outer diameter portion 314, FIG. 20, keyed to and engaging drive sleeve 308 as later described. Preferably outer diameter portion 314 has a plurality of outer splines 316 to engage drive sleeve 308.

Figure 21:
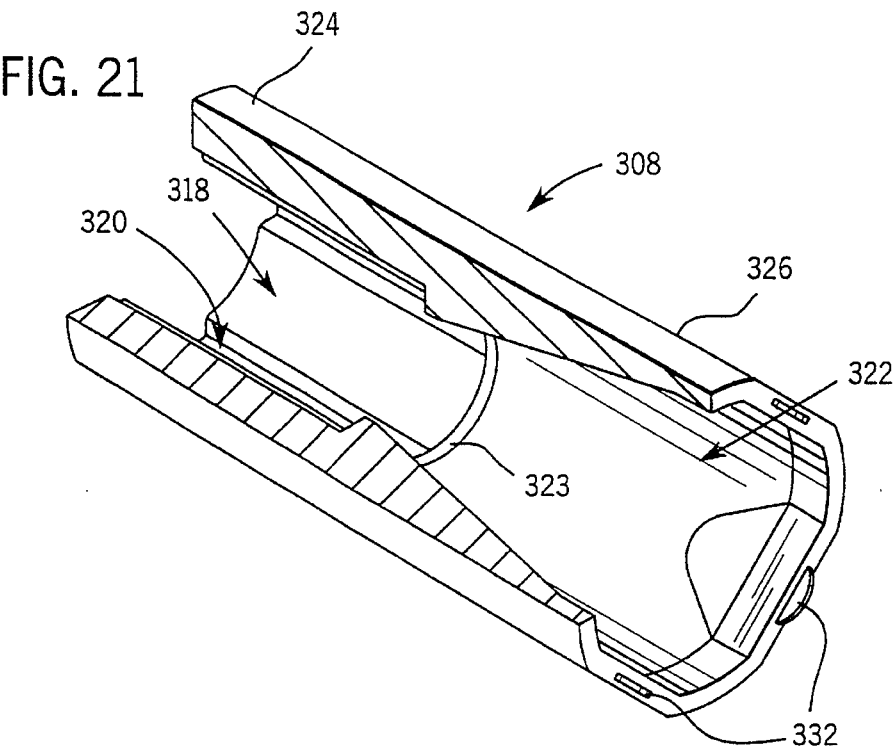
FIG. 21 is a perspective view partially cut away of the drive sleeve of FIG. 19.
Figure 22:
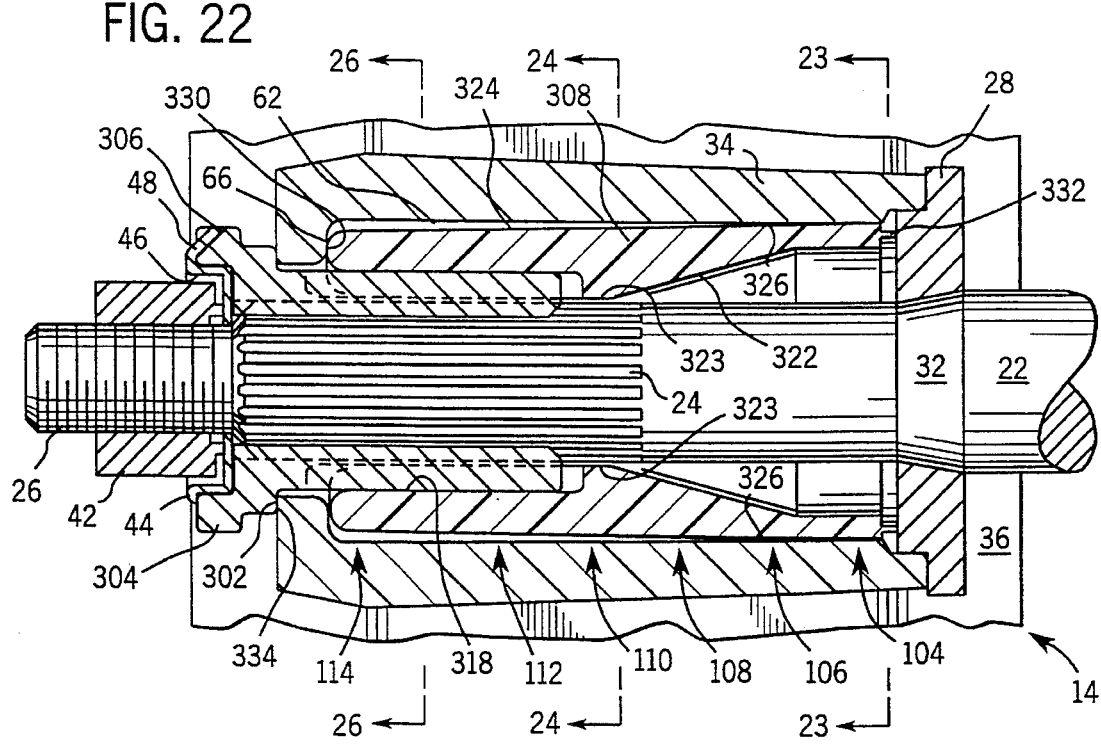
FIG. 22 is a cross-sectional view of a portion of the structure of FIG. 19 in assembled condition.

Drive sleeve 308, FIGS. 21 and 22, has a rearward inner diameter portion 318 keyed to and engaging drive sleeve adapter 304 in driven relation. It is preferred that inner diameter portion 318 have a plurality of inner splines 320 engaging the adapter outer splines 316, FIG. 20, in splined driven relation. Drive sleeve 308 has a forward inner diameter portion 322 spaced axially forward of drive sleeve adapter 304, and spaced radially outward of drive shaft 22, FIG. 22. Forward inner diameter portion 322 begins at inner diameter transition portion 323, FIGS. 21 and 22, and tapers radially outward as it extends axially forward increasing the radial separation from propeller shaft 22 with increasing axial distance from inner diameter transition portion 323. Drive sleeve 308 has an annular thickness which is largest at inner diameter transition portion 323, and decreases along tapered forward inner diameter portion 322 with increasing axial distance from rearward inner diameter portion 318. The narrowest annular thickness of drive sleeve 308 is at the forward axial end of forward inner diameter portion 322 spaced axially farthest from rearward inner diameter portion 318.

Drive sleeve 308, FIGS. 21 and 22, has a rearward outer diameter portion 324 radially aligned with rearward inner diameter portion 318. Drive sleeve 308 has a forward outer diameter portion 326 radially aligned with forward inner diameter portion 322 and axially spaced forward from inner diameter portion 318 and outer diameter portion 324.

The outer diameter of drive sleeve 308 is tapered to have a larger outer diameter at forward portion 326 than at rearward portion 324. Forward outer diameter portion 326 snugly engages the propeller hub at portion 34, FIGS. 22 and 23, in keyed relation at area 104. Preferably, the outer diameter of drive sleeve 308 is polygon shaped, FIG. 23. As shown in FIG. 24, rearward outer diameter portion 324 is spaced slightly radially inwardly of inner propeller hub portion 34 forming a small radial gap 62 such that rearward outer diameter portion 324 of drive sleeve 308 may partially rotate relative to inner propeller hub 34 in response to rotation of propeller shaft 22 drivingly engaging adapter 304 which drivingly engages drive sleeve 308. Propeller shaft 22 drives adapter 304 by splined portion 24 engaging adapter inner splines 312 of adapter 304. Adapter 304 drives drive sleeve 308 by adapter outer splines 316 engaging drive sleeve inner splines 320 of drive sleeve 308.

The outer surface of drive sleeve 308 and the inner surface of inner propeller hub 34 are tapered relative to each other such that the radial thickness of gap 62 increases as it extends axially rearward as shown in FIG. 22. At the forward end of drive sleeve 308, FIG. 23, there is a snug fit between drive sleeve 308 at outer diameter portion 326 and inner propeller hub 34 such that there is no radial gap. At the rearward end of drive sleeve 308, radial gap 62 is at its largest dimension, FIGS. 22 and 26.

When propeller 12, FIG. 1, strikes an object, propeller shaft 22, FIGS. 24 and 25, drive sleeve adapter 304, and the rearward portion of drive sleeve 308 continue to rotate to a further rotated position as shown in FIG. 25. Outer tips 328 of drive sleeve 308 engage inner propeller hub portion 34 of propeller hub 14. The axial length of the engagement increases with increasing angular rotation of propeller shaft 22, adapter 304, and the rearward portion of drive sleeve 308. For example, referring to FIG. 22 and assuming that the propeller has struck an object, propeller shaft 22, drive sleeve adapter 304, and the rearward portion of drive sleeve 308 continue to rotate even though inner propeller hub 34 has stopped. After 1° of rotation, drive sleeve 308 engages inner propeller hub 34 not only at forward area 104, but also at area 106 slightly rearward thereof, as a result of the 1° rotation. Prior to the propeller striking the object there is no torsional rotation and a small radial gap exists between drive sleeve 308 and inner propeller hub 34 at area 106. After 2° of torsional rotation resulting from the propeller striking an object, drive sleeve outer tips 328, FIG. 24, are rotated into contact with inner propeller hub 34 at area 108, FIG. 22. After 3° of rotation, the point of interference contact extends rearwardly to area 110, such that axial length of interference engagement extends from forward area 104 rearward to area 110. FIG. 25 illustrates the 3° torsional rotation example at area 110 with outer tips 328 engaging inner propeller hub 34. Comparing FIG. 24 which illustrates no torsional rotation and FIG. 25 which illustrates 3° of torsional rotation, it becomes evident that while inner propeller hub 34 has stopped rotating, propeller shaft 22 and adapter 304 are permitted to continue rotating to a certain rotated angle. After 5° of rotation, there is contact at area 112, FIG. 22. These noted examples are illustrative and the points of contact may vary depending upon tolerances and taper.

It is believed particularly important to minimize shock load to the drive within the first 5° of rotation of the propeller shaft after the propeller is stopped by an object. Therefore, it is preferred that the tapered gap 62 between drive sleeve 308 and inner propeller hub 34 allow at least 5° rotation before drive sleeve 308 completely engages inner propeller hub 34 in interference fit. For example, 5° torsional rotation will cause interference fit between drive sleeve 308 and inner propeller hub 34 from area 104 to area 112, FIG. 22. Further torsional rotation, past 5°, will cause the interference fit to extend to area 114 and eventually result in drive sleeve 308 cracking and/or splintering at approximately 25° of torsional rotation which allows propeller shaft 22 to continue rotating to prevent damage to the marine drive.

Figure 26:
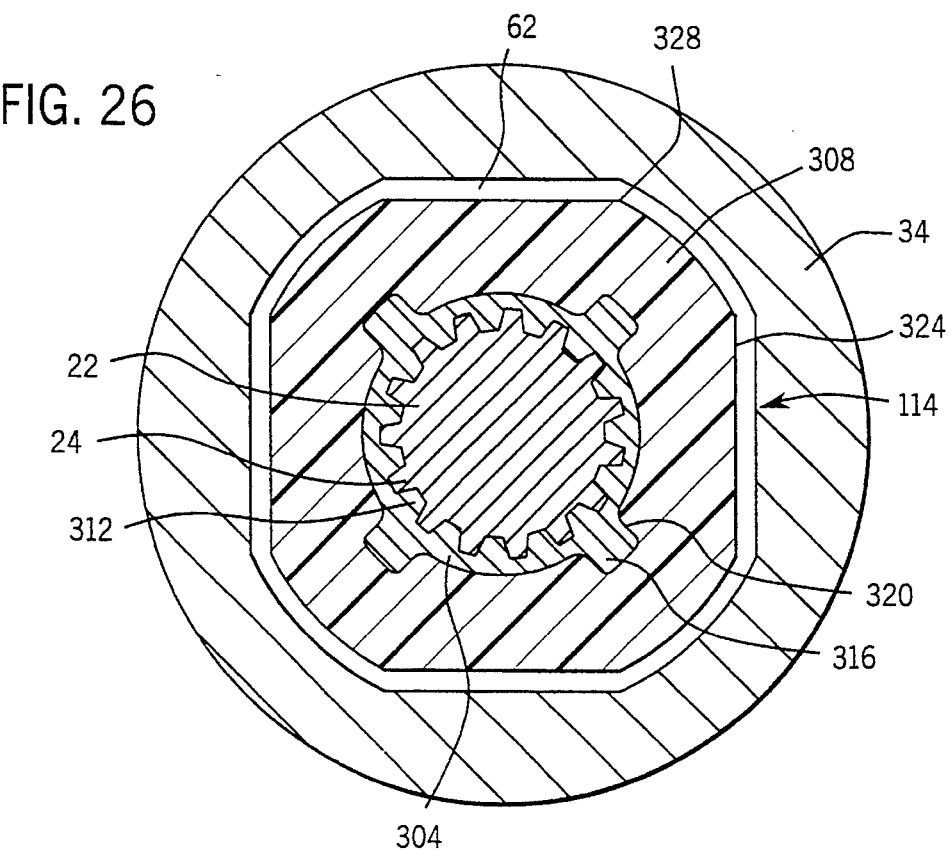
FIG. 26 is a sectional view taken along line 26—26 of FIG. 22.
Figure 27:
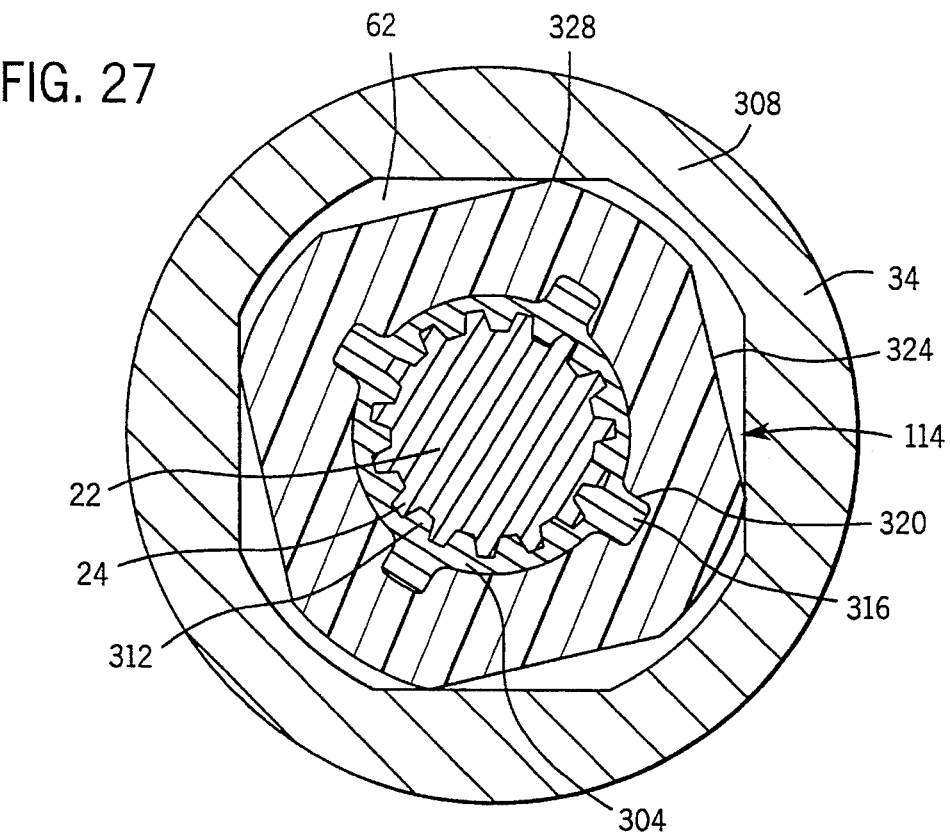
FIG. 27 is a view like FIG. 26 and shows a further rotated position.

Further rearward areas such as 114, FIG. 22, allow rotation to even further rotated positions than area 112. For example, FIGS. 22 and 26 show that radial gap 62 is wider at area 114 than at area 110, FIG. 24. Accordingly, the rearward portion of drive sleeve 308 at area 114 rotates to a further rotated position as shown in FIG. 27. As each area 106, 108, 110, etc., FIG. 22, of drive sleeve 308 progressively engage inner propeller hub 34 in interference fit, the remaining rearward portion of drive sleeve 308 which is not yet in contact with inner propeller hub 34 continues to rotate by torsional twisting. The engagement area may continue to rotate slightly due to compression of outer tips 328, FIGS. 25 and 27, and the torsional twisting of the drive sleeve areas already in contact with inner propeller hub 34. The noted torsional twisting is a function of the structural configuration and the material of drive sleeve 308, as previously explained. Preferably, drive sleeve 308 is composed of extrudable grade resin plastic known in the trade as Delrin II 150E, as above described, and drive sleeve adapter 304 is preferably composed of brass.

Referring to FIG. 19, during assembly, drive sleeve 308 is slid rearwardly into propeller hub 14 until rear shoulder 330, FIG. 22, of drive sleeve 308 is in contact with shoulder 66 of inner propeller hub 34. Hub 14, FIG. 19, drive sleeve 308, and forward thrust washer 28 are then slid forwardly onto propeller shaft 22, until the forward end of inner hub portion 34 engages forward thrust washer 28, FIG. 22, and forward thrust washer 28 engages tapered transition portion 32 of propeller shaft 22. Drive sleeve adapter 304, FIG. 19, with integral rear thrust hub 302 is slid forwardly into propeller hub 14 and drive sleeve 308 and over propeller shaft 22 engaging splines 24 until integral rear thrust hub 302 is stopped against rear hub shoulder 334 of inner hub 34. Locking tab washer 44, FIGS. 19 and 22, and nut 42 are then assembled and torqued down. Forward molded spacing bumps 332 on drive sleeve 308 are compressed against forward thrust washer 28, FIG. 22, during the torquing of nut 42 to provide tolerance compensation.

It is recognized that various equivalents, alternatives and modifications are possible within the scope of the appended claims.

We claim:

1. A marine drive comprising a propeller with a hub, an axially extending propeller shaft, a drive sleeve adapter drivingly engaging said propeller shaft, a shock absorbing drive sleeve in said propeller hub mounting said propeller hub to said drive sleeve adapter on said propeller shaft wherein said drive sleeve adapter comprises an inner diameter portion engaging said propeller shaft in driving relation and an outer diameter portion engaging said shock absorbing drive sleeve in driving relation, and wherein said shock absorbing drive sleeve comprises a first inner diameter portion engaging said adapter in driving relation and a first outer diameter portion at least partially rotatable relative to said propeller hub, a second outer diameter portion axially spaced from said first outer diameter portion and engaging said propeller hub in driving relation, wherein said second outer diameter portion snugly engages said propeller hub, and said first outer diameter portion at least partially rotates relative to said propeller hub in response to rotation of said propeller shaft drivingly engaging said drive sleeve adapter which drivingly engages said drive sleeve such that when said propeller strikes an object, the shock is absorbed by torsional twisting of said drive sleeve wherein said first outer diameter portion continues to rotate to a further rotated position than said second outer diameter portion.

2. The invention according to claim 1 wherein said drive sleeve is composed of a plastic material providing at least 5° of torsional twisting angular rotation at torque loads less than 500 lb.ft., and having a spring rate less than 100 lb.ft. per degree for torsional twisting from 0° to 5° rotation, and torsionally twisting to angular rotations greater than 5° and supporting over 1,000 lb.ft. torque before failure.

3. The invention according to claim 2 wherein said spring rate is greater than 100 lb.ft. per degree from 5° to 10° rotation.

4. The invention according to claim 3 wherein said drive sleeve torsionally twists at least 15° before failure.

5. The invention according to claim 1 wherein said drive sleeve is composed of a plastic material providing torsional twisting angular rotation at a first spring rate from 0° to 5° rotation, a second higher spring rate from 5° to 10° rotation, and supporting a torsional load of over 1,000 lb.ft. torque before failure.

6. The invention according to claim 1 wherein said drive sleeve is extrudable grade acetal resin plastic.

7. The invention of claim 1 wherein the drive sleeve adapter is brass.

8. The invention according to claim 1 wherein said propeller hub is mounted on said propeller shaft between fore and aft thrust washers, said hub having a forward end engaging said fore thrust washer, and a rearward end engaging said aft thrust washer, and wherein said first outer diameter portion of said drive sleeve is aft of said second outer diameter portion of said drive sleeve and forward of said aft thrust washer, and said second outer diameter portion of said drive sleeve is aft of said fore thrust washer.

9. The invention according to claim 8 wherein the aft thrust washer is an integral part of the drive sleeve adapter constituting a thrust washer and drive sleeve adapter combination.

10. The invention according to claim 9 comprising a propeller nut threaded onto said propeller shaft aft of said aft thrust washer and drive sleeve adapter combination such that upon torquing of said nut said propeller hub is tightly held between said fore and aft thrust washers, and comprising a plurality of forward molded spacing bumps on said drive sleeve forward of said second outer diameter portion and extending forwardly from said drive sleeve and engaging said fore thrust washer and compressible during torquing of said propeller nut to provide tolerance compensation.

11. The invention according to claim 10 wherein said bumps are spaced about said propeller shaft in a balanced pattern providing balanced axial loading and uniform axial registration of said drive sleeve within said propeller hub and on said propeller shaft to prevent cocking of said drive sleeve relative thereto and maintaining alignment of said drive sleeve parallel to said propeller hub and parallel to said propeller shaft.

12. A marine drive comprising a propeller with a hub, an axially extending propeller shaft, a shock absorbing drive sleeve and adapter assembly mounting said propeller hub to said propeller shaft wherein said assembly comprises an inner diameter portion keyed to and engaging said propeller shaft in driven relation, a first outer diameter portion radially aligned with said inner diameter portion, a second outer diameter portion axially spaced from said inner diameter portion and said first outer diameter portion and engaging said propeller hub in driving relation, wherein said second outer diameter portion snugly engages said propeller hub, and said first outer diameter portion at least partially rotates relative to said propeller hub in response to rotation of said propeller shaft drivingly engaging said inner diameter portion, such that when said propeller strikes an object, the shock is absorbed by torsional twisting of said drive sleeve wherein said inner diameter portion and said first outer diameter portion continue to rotate to a further rotated position than said second outer diameter portion.

13. The invention according to claim 12 wherein said drive sleeve is composed of a plastic material providing torsional twisting angular rotation at a first spring rate less than 100 lb.ft. per degree from 0° to 5° rotation, a second higher spring rate beyond 5° rotation, and supporting over 1,000 lb.ft. torque before failure.

14. The invention according to claim 13 wherein said drive sleeve is extrudable grade acetal resin plastic.

15. The invention according to claim 12 wherein the adapter inner diameter portion is brass.

16. A marine drive comprising a propeller with a hub, an axially extending propeller shaft, a shock absorbing drive sleeve and adapter assembly in said propeller hub mounting said propeller hub to said propeller shaft and comprising an inner diameter portion keyed to and engaging said propeller shaft in driven relation, a first outer diameter portion radially aligned with said inner diameter portion, said first outer diameter portion and said propeller hub being in spaced but keyed relation permitting limited rotation of said first outer diameter portion through a given angle relative to said propeller hub, followed by an interference fit and co-rotation thereof, a second outer diameter portion axially spaced from said first outer diameter portion and keyed to and engaging said propeller hub in driving relation, wherein said second outer diameter portion snugly engages said propeller hub, and said first outer diameter portion at least partially rotates relative to said propeller hub in response to rotation of said propeller shaft drivingly engaging said inner diameter portion, such that when said propeller strikes an object, the shock is absorbed by torsional twisting of said drive sleeve wherein said first outer diameter portion continues to rotate to a further rotated position than said second outer diameter portion, said first outer diameter portion rotating through said given angle to said further rotated position whereupon said first outer diameter portion engages said propeller hub in said interference fit whereafter said first outer diameter portion and said propeller hub rotate together wherein said drive sleeve and adapter assembly has an overall axial length, and said inner diameter portion engaging said propeller shaft has an axial length which is 40% to 50% of said overall axial length.

17. The invention according to claim 16 wherein said first outer diameter portion is spaced radially inwardly of said propeller hub by a radial gap.

18. The invention according to claim 17 wherein said gap normally extends continuously around the entire periphery of said first outer diameter portion, unless said propeller strikes an object, whereupon selected sections of said gap are closed as said first outer diameter portion rotates through said given angle relative to said propeller hub and engages said propeller hub in said interference fit at said selected sections.

19. The invention according to claim 17 wherein said first outer diameter portion includes a plurality of radiused corners spaced radially inwardly of said propeller hub and rotatable through said given angle relative to said propeller hub to engage said propeller hub at said selected sections.

20. The invention according to claim 16 wherein the shock absorbing drive sleeve and adapter assembly has a brass insert.

21. In a marine drive comprising a propeller with a hub and an axially extending propeller shaft, a shock absorbing drive sleeve and a drive sleeve adapter mounting said propeller hub to said propeller shaft and comprising an inner diameter portion of the drive sleeve adapter keyed to and engaging said propeller shaft in driven relation, an inner diameter portion of the drive sleeve engaging said drive sleeve adapter in driven relation, a first outer diameter portion of the drive sleeve radially aligned with said drive sleeve inner diameter portion, a second outer diameter portion of the drive sleeve axially spaced from said first drive sleeve outer diameter portion and keyed to and engaging said propeller hub in driving relation, wherein said drive sleeve and said propeller hub are tapered relative to each other such that said drive sleeve second outer diameter portion snugly engages said propeller hub, and said drive sleeve first outer diameter portion at least partially rotates relative to said propeller hub in response to rotation of said propeller shaft drivingly engaging said adapter inner diameter portion which drivingly engages said drive sleeve inner diameter portion, such that when said propeller strikes an object, the shock is absorbed by torsional twisting of said drive sleeve wherein said drive sleeve inner diameter portion and said drive sleeve first outer diameter portion continue to rotate to a further rotated position than said second outer diameter portion and wherein said drive sleeve inner diameter portion is keyed to and engaging said drive sleeve adapter in driven relation, and said drive sleeve inner diameter and first outer diameter portions rotate to said further rotated position relative to said drive sleeve second outer diameter portion.

22. The invention according to claim 21 wherein said drive sleeve adapter and said inner diameter portion of said drive sleeve have splines and engage in splined driving relation, and wherein said drive sleeve inner diameter portion and said drive sleeve first outer diameter portion rotate to said further rotated position relative to said second outer diameter portion, whereafter the drive sleeve cracks and splinters.

23. The invention according to claim 22 wherein said further rotated position of said drive sleeve inner diameter and first outer diameter portions is about 25° beyond the position of said drive sleeve second outer diameter portion.

24. The invention according to claim 22 wherein the splines of the drive sleeve adapter are brass.

* * * * *